(12) United States Patent
Kassab

(10) Patent No.: US 7,533,144 B2
(45) Date of Patent: May 12, 2009

(54) METHOD OF PROVIDING A WEB PAGE WITH ADDITIONAL CONTENT INSERTED IN AN INTERMEDIATE NETWORK ENTITY (INE) PLATFORM

(76) Inventor: Hisham Kassab, 8070 Georgia Ave., Bethesda, MD (US) 20910

( * ) Notice: Subject to any disclaimer, the term of this patent is extended or adjusted under 35 U.S.C. 154(b) by 964 days.

(21) Appl. No.: 11/129,476

(22) Filed: May 16, 2005

(65) Prior Publication Data

US 2006/0031404 A1    Feb. 9, 2006

Related U.S. Application Data

(60) Provisional application No. 60/570,898, filed on May 14, 2004.

(51) Int. Cl.
G06F 15/16    (2006.01)
(52) U.S. Cl. .................. 709/203; 709/218; 709/219; 709/223; 709/246; 707/E17.116; 715/749
(58) Field of Classification Search .............. 709/203, 709/217–219, 223, 246; 707/E17.116; 715/749
See application file for complete search history.

(56) References Cited

U.S. PATENT DOCUMENTS

| | | | | |
|---|---|---|---|---|
| 6,112,212 | A * | 8/2000 | Heitler ................. | 715/206 |
| 6,128,651 | A * | 10/2000 | Cezar ................... | 709/217 |
| 6,339,761 | B1 | 1/2002 | Cottingham | |
| 6,973,505 | B1 * | 12/2005 | Schneider ............. | 709/245 |
| 7,293,034 | B2 * | 11/2007 | Paya et al. ............. | 707/101 |
| 2001/0020242 | A1 * | 9/2001 | Gupta et al. .......... | 707/501.1 |
| 2002/0016736 | A1 * | 2/2002 | Cannon et al. ........ | 705/14 |
| 2002/0123334 | A1 * | 9/2002 | Borger et al. ......... | 455/419 |
| 2003/0004998 | A1 * | 1/2003 | Datta .................... | 707/513 |
| 2003/0026231 | A1 * | 2/2003 | Lazaridis et al. ..... | 370/338 |
| 2003/0046149 | A1 * | 3/2003 | Wong .................... | 705/14 |
| 2003/0128234 | A1 * | 7/2003 | Brown et al. ......... | 345/744 |
| 2004/0073713 | A1 * | 4/2004 | Pentikainen et al. ........ | 709/249 |
| 2004/0075686 | A1 * | 4/2004 | Watler et al. ................ | 345/749 |
| 2004/0165007 | A1 * | 8/2004 | Shafron ...................... | 345/781 |
| 2004/0210536 | A1 * | 10/2004 | Gudelj et al. ................ | 705/64 |
| 2004/0221034 | A1 | 11/2004 | Kausik et al. | |
| 2005/0076132 | A1 * | 4/2005 | Roberts et al. .............. | 709/228 |
| 2005/0144324 | A1 | 6/2005 | George et al. | |
| 2005/0187895 | A1 * | 8/2005 | Paya et al. .................... | 707/1 |
| 2005/0197164 | A1 * | 9/2005 | Chan ............................ | 455/566 |
| 2005/0246414 | A1 * | 11/2005 | Barda .......................... | 709/203 |
| 2008/0046803 | A1 * | 2/2008 | Beauchamp et al. ........ | 715/212 |

OTHER PUBLICATIONS

International Search Report of PCT/US05/17104 mailed Nov. 6, 2006.
J. Elson and A. Cerpa, Internet Content Adaptation Protocol (ICAP) W3C Network Working Group, Apr. 2003, (www.ietf.org/rfc/rfc3507.text).
Page Printed from website on Nov. 27, 2006 (first page and scrolled page).

* cited by examiner

*Primary Examiner*—Oanh Duong
(74) *Attorney, Agent, or Firm*—Dickinson Wright, PLLC; John M. Naber

(57) ABSTRACT

Methods and systems are provided for inserting content into a web page and providing the modified web page to a web browser. A request for a web page is intercepted and redirected to a web page processing agent, which fetches the requested web content. A new web page is generated that includes the requested web content and inserted content provided from another source, such as from an ISP. The inserted content is presented in a dedicated screen area. The new web page may include a first frame comprising the inserted content and a second frame including the requested web content, such that the end user can scroll the web content without affecting the inserted content.

25 Claims, 24 Drawing Sheets

METHOD OF PROVIDING A WEB PAGE WITH ADDITIONAL CONTENT INSERTED IN AN INTERMEDIATE NETWORK ENTITY (INE) PLATFORM

CROSS-REFERENCE TO RELATED APPLICATIONS

This patent application claims priority to and hereby incorporates by reference U.S. Application Ser. No. 60/570,898, filed on May 14, 2004.

FIELD OF THE INVENTION

The invention relates to the insertion of content into a web page or other content for display in a web browser. The content may be inserted, for example, by an Internet Service Provider before the requested web page is provided to the web browser.

BACKGROUND OF THE INVENTION

Internet Service Providers (ISPs) in general have increasingly been relegated to commoditized bit-pipes that carry Internet traffic from the end-user to different portals and websites on the World Wide Web. Despite the dotcom bust, surviving companies such as Yahoo, Amazon, Ebay and Google are thriving. However, ISPs have been largely kept out of this business. It may be too late for ISPs to compete with the likes of Yahoo, Amazon, Ebay and Google.

Conventional public Wi-Fi hotspot controllers have experimented with Point-of-Sale (POS) advertising on the user's screen using several technologies/means including (1) unsolicited pop-up windows; and (2) URL redirection, whereby the end-user, upon starting up the web browser, is redirected to a login page that typically contains advertising for the location owner. The first method is annoying to users. The second method is minimally intrusive to users, but the advertising appears only once, unless the user is redirected to the login page at regular intervals—which after a while may offend the user.

It would be advantageous to provide a means for an ISP or other entity to insert content into web pages before they are provided to a web browser, such that content separate from the requested web page is presented to a user. Such means would permit ISPs or other entities to provide e-commerce, advertising or other services that are integrated with the presentation of content provided to the user.

SUMMARY OF THE INVENTION

The invention includes various systems and methods for inserting content into a web page and providing the modified web page to a web browser. In one variation, a request for a web page is intercepted and redirected to a web page processing agent, which fetches the requested web content. A new web page is generated that includes the requested web content and inserted content provided from another source, such as from an ISP. The inserted content is presented in a dedicated screen area.

In another variation, the new web page includes a first frame comprising the inserted content and a second frame including the requested web content, such that the end user can scroll the web content without affecting the inserted content.

In yet another variation, the web processing agent is able to determine whether the user has requested a new web page or has clicked on a link in the previous web page, thus leading to a different decision as to whether to regenerate the first frame with the inserted content.

In yet other variations, state information is maintained concerning a previously-requested web page, which controls whether the dedicated screen area is regenerated or not.

Other variations and embodiments are described in more detail below, and the invention is not intended to be limited in any way by this brief summary.

The invention can be used in various environments, such as in a public Wi-Fi hotspot controller, which can use the dedicated screen estate to provide a range of software applications such as e-commerce, advertising, discount coupons, and the like.

DETAILED DESCRIPTION OF THE INVENTION

Figure 1:
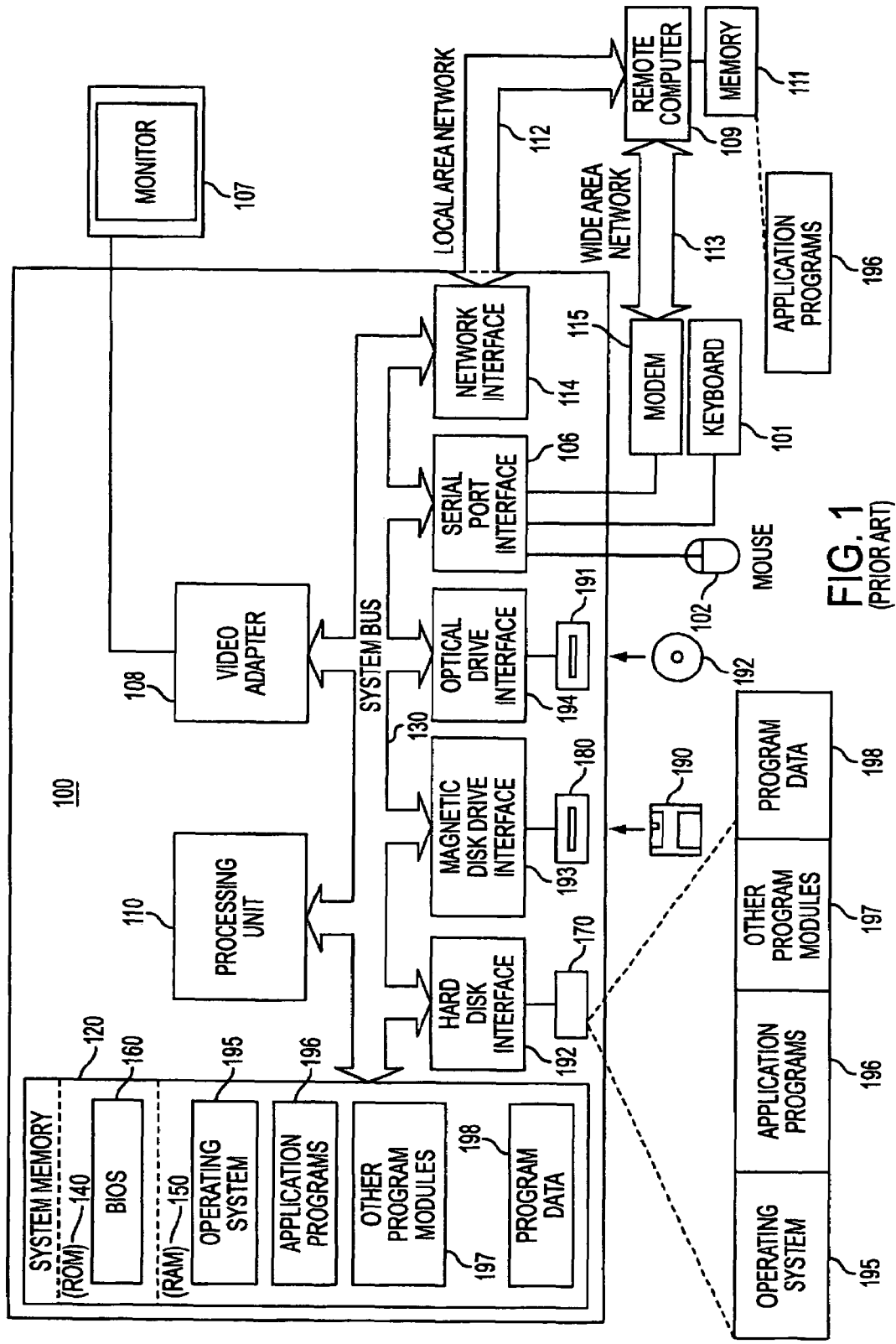
FIG. 1 shows a conventional general-purpose computing environment that can be employed in various embodiments of the invention.

FIG. 1 is a schematic diagram of a conventional general-purpose digital computing environment that can be used to implement various aspects of the invention. Computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory includes read only memory (ROM) 140 and random access memory (RAM) 150.

A basic input/output system 160 (BIOS), containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, game port or a universal serial bus (USB). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

The client-server software architecture is a versatile, message-based and modular infrastructure. A client is defined as a requestor of services and a server is defined as a provider of services. The term "server" or "client" may refer to either a piece of software, or the computer that is hosting that piece of software. In this description, it shall be assumed that the term "server" or "client" refers to a piece of software. The respective computers will be referred to as server computer and client computer. Thus, a "mail client" refers to the mail software that resides on a client computer. A server may reside on one or more server computers. Conversely, a server computer may host more than one server. Server computers tend to be more powerful than client computers, and are typically designed with some redundancy in power, network, computing, and file storage.

Figure 2:
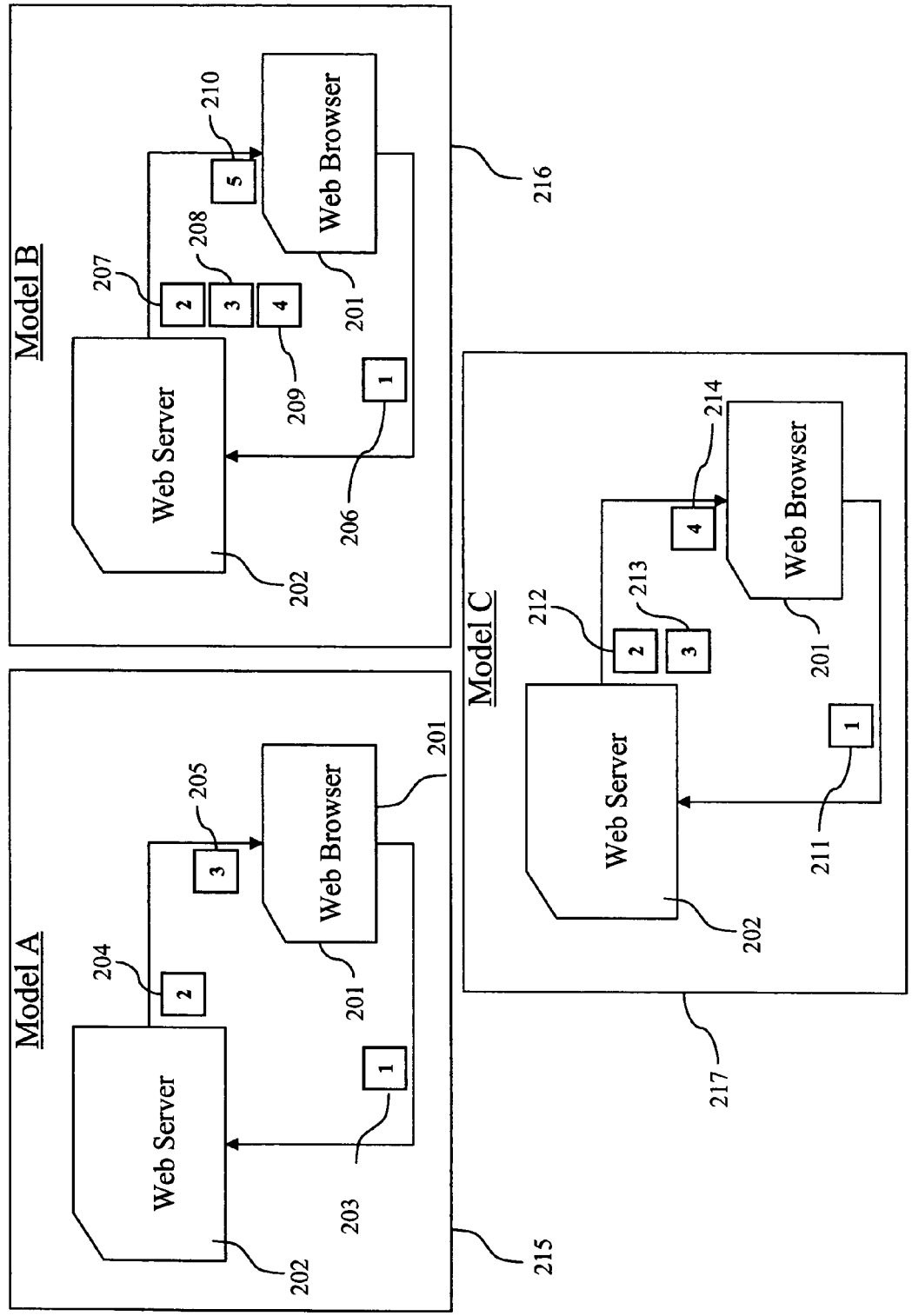
FIG. 2 shows three different models for requesting web content from a web browser.

FIG. 2 provides an illustration of various client-server architectures using the widely used web browsing architecture. As FIG. 2 illustrates, web browsing has a client-server architecture, whereby the client 201 is typically referred to as a web browser, and the server 202 is typically referred to as a web server. In Model A 215, the interaction begins with 203, with the web browser requesting a particular html file. The web server locates the file and sends it to the web browser 204, and the web browser displays the file 205. In Model A 215, the HTML page is static, which means it will not change unless it is explicitly modified by its author/developer. In Model B 216, the web server performs some processing, based on CGI technology. After the web browser sends its request 206, the web server locates an appropriate CGI program and passes the request to that CGI program 207. The CGI program processes the request and sends the resulting output data back to the web server 208. The web server then sends that data back to the web browser 209, and the web browser displays the data 210. In Model B 216, the CGI program generates a dynamic HTML page. The contents of the page depend on the query passed to the CGI program. Model C 217 shows another case involving a dynamic response. In this model, the dynamic response is generated using server side technologies such as (1) Personal Home Pages (PHP); (2) Active Server Pages (ASP); (3) Java Server Pages; and (4) Server Side Includes (SSI).

In Model C 217, after the web browser sends its request 211, the web server checks the corresponding file and executes any embedded scripts 212, and puts together the final formatted document to be sent to the web browser 213. The web browser then displays the document 214.

Clients and servers communicate with each other using a set of instructions, referred to as protocols, over networks. Indeed, networks may be considered the backbone of client-server relationships. Clients may communicate with servers over any of various conventional networking technologies including but not limited to (1) Ethernet-based local area networking; (2) wide area networking; and (3) TCP/IP-based Internet networking.

The Internet has become widely used network for various client-server applications.

Indeed, the Internet revolves around the client-server architecture. Client-server applications available over the Internet include but are not limited to (1) web browsing; (2) email; (3) gaming; (4) streaming audio; (5) streaming video; (6) file transfer; and (7) special-purpose applications. Among the widely available clients used in Internet-based client-server applications are: (1) Web browsers such as Internet Explorer, Firefox, Netscape (including media players within the web browser); (2) Email clients such as Netscape Communicator, Microsoft Outlook, Microsoft Outlook Express, and Eudora; (3) Newsgroups clients; (4) instant messaging applications; (5) audio players such as RealPlayer; (6) video players such as MediaPlayer; (7) custom-made applications such as Softphones for Voice-over-IP. The client device hosting the client software is typically a client computer; however, it may also be a dedicated device such as a TV, an audio player or a game player. Any or all of the above may be used in conjunction with the inventive principles.

A request for service sent from a client to a server shall be referred to as request message. An example of a request message is an HTTP request. The service provided by the server shall be referred to as a response message. One example of a response message is an HTML document that is typically provided by a web server.

Figure 3:
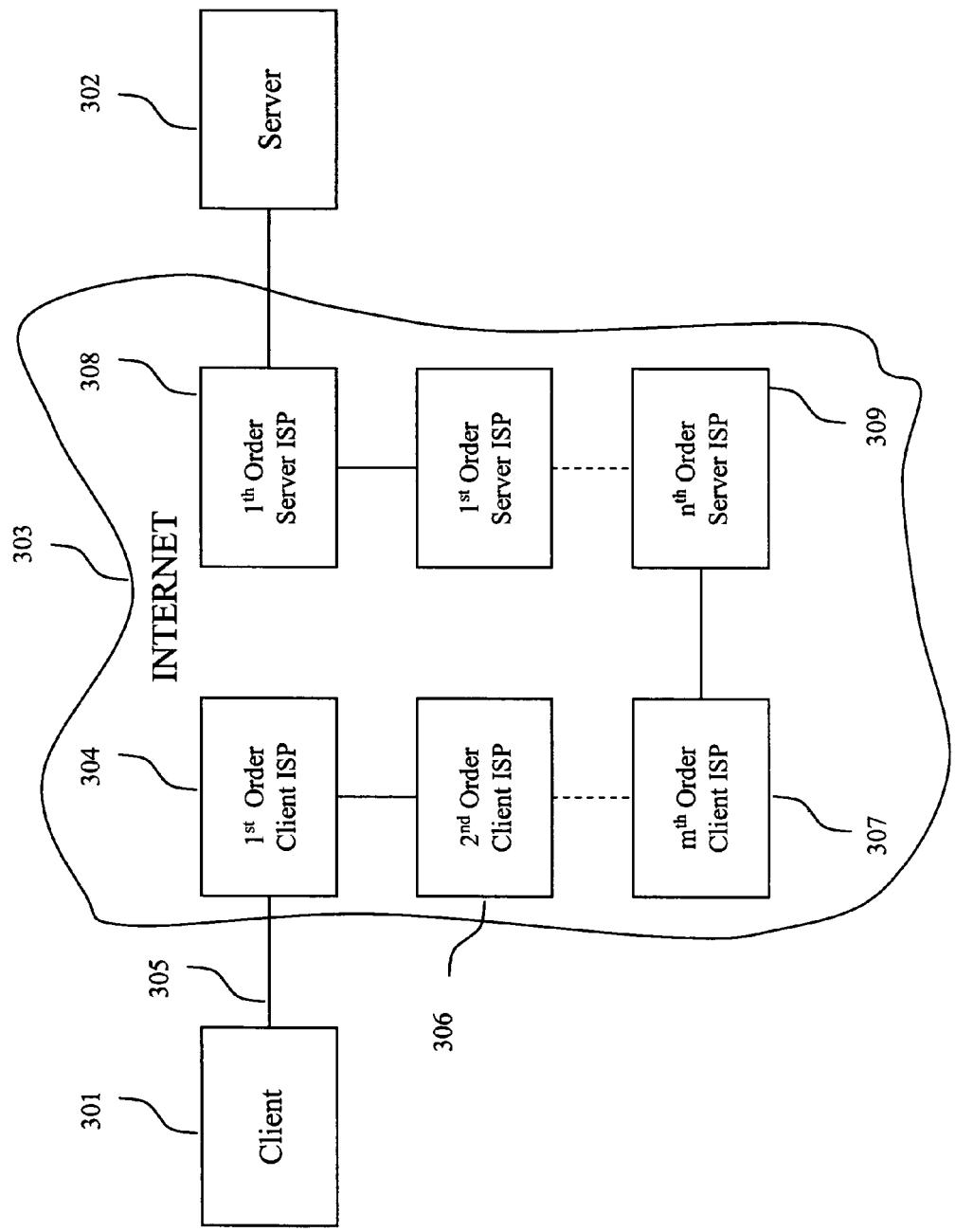
FIG. 3 shows how a client and server may be connected through various Internet Service Providers (ISPs).

FIG. 3 illustrates how a client 301 and server 302 may be connected via the Internet 303. The client typically has an Internet Service Provider (ISP), such as first-order ISP 304. The client 301 connects to 304 via path 305 which may be any of several types of connection including dial-up, DSL, cable modem, fixed wireless, Wi-Fi, and cellular. First-order ISP 304 may have its own ISP, 306, which in turn may have its own ISP and so on. FIG. 3 depicts a hierarchy of m ISPs on the client side. A similar structure exists on the server side, where the server has an ISP 308, which itself is part of a chain of ISPs that goes up to an $n^{th}$ ISP 309, which connects with the $m^{th}$ ISP on the client side. (The $m^{th}$ client ISP and the nth server ISP may be the same ISP.) The point of FIG. 3 is that Internet traffic/data exchanged between a client 301 and a server 302 typically passes through the gateways (also known as edge routers) of several Internet Service Providers.

Figure 4:
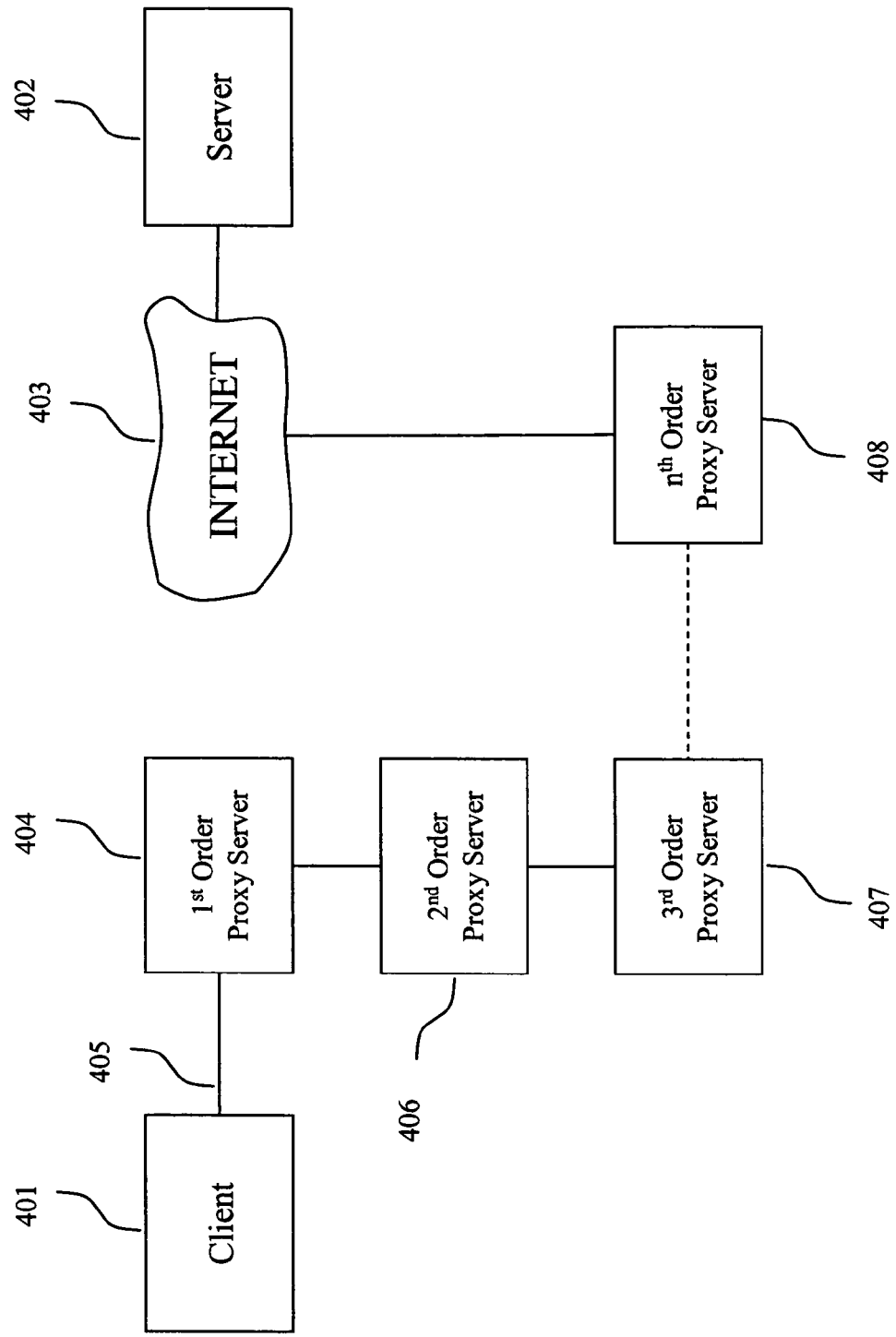
FIG. 4 shows how Internet traffic between a client and server may pass through one or more proxy servers.

FIG. 4 shows that Internet traffic between a client 401 and a server 402 may pass through one or more proxy servers 404 before flowing through the Internet 403. A proxy server "hears" and services requests from its clients, often re-initiating requests on behalf of its clients and passing the corresponding responses to the clients. A client may explicitly redirect traffic to the proxy server, or the traffic may be redirected without the explicit specification of the client. The connection between the client and the proxy server 405 may take several forms, including a point-to-point connection, a connection over a local area network, or a connection over the Internet. Also, as with the hierarchy of ISPs, it is possible to have a hierarchy of proxy servers 406, 407 and 408 as shown in FIG. 4.

FIG. 3 and FIG. 4 illustrate that there may be several entities on the path between a client and a server. This can be true even if the client and the server are on the same local area network or wide area network (i.e., not connected over the Internet). Any such entity on the path between a client and a server shall be referred to as an "intermediate network entity" (NE). By virtue of being physically in the path between the client and the server, an INE potentially can modify the client's request message before it reaches the server, as well as the server's response message before it reaches the client. An INE may comprise a proxy server; an ISP; or a VPN device, for example.

According to various aspects of the present invention, an INE or other entity may leverage its position on the client-server path to establish an INE "platform" within the server's response message or in parallel with the server's response message. The term "platform" in this context should be understood to refer to a dedicated screen area, device, space in time, or other item (including the examples below) containing content that is generated and presented in conjunction with user-requested web content, but that is separately controlled by an entity, such as an INE, other than the entity providing the web content. The term "INE platform" should therefore be understood to refer to a "platform" that is controlled by or inserted by an "INE."

Figure 5:
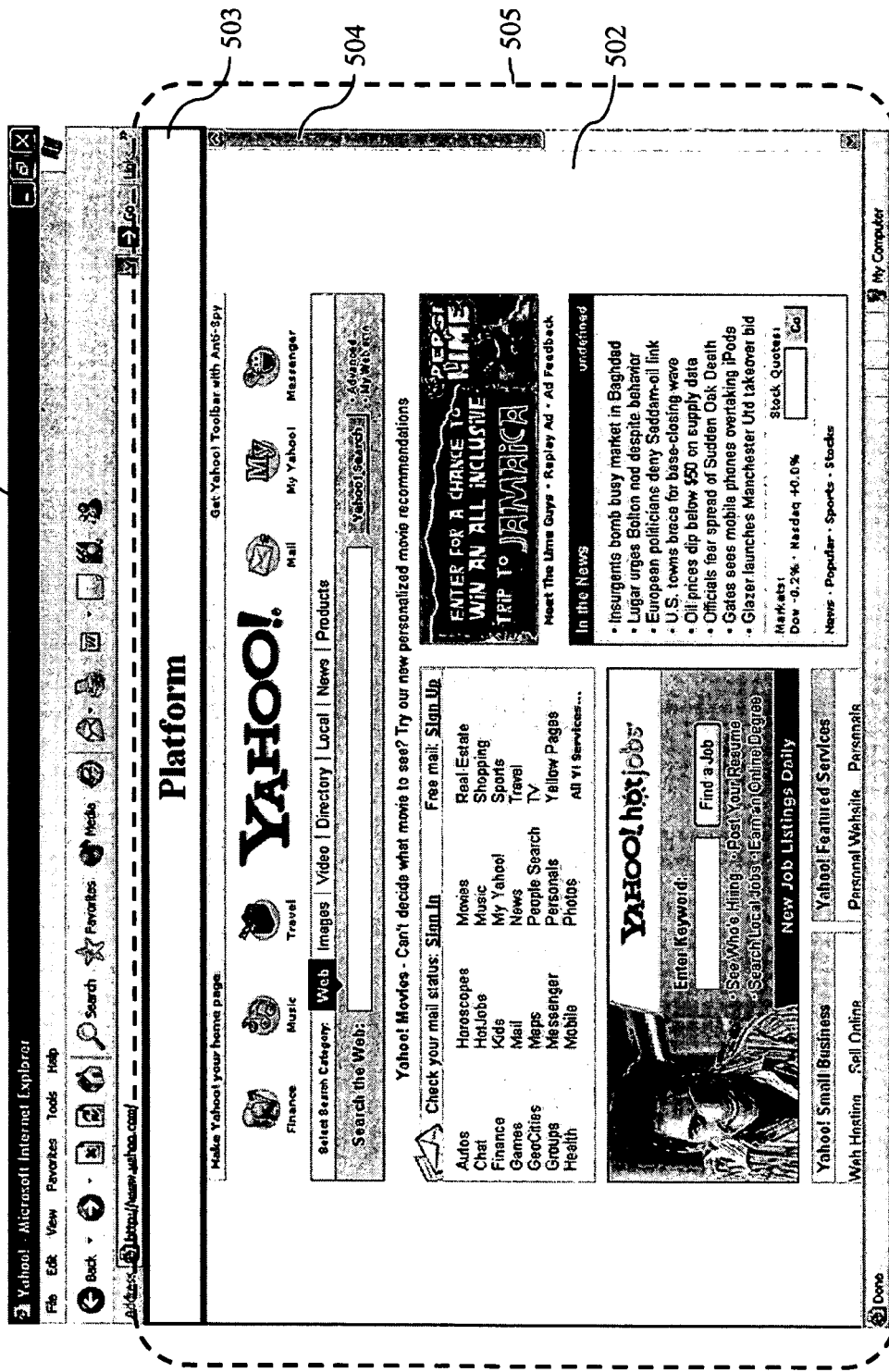
FIG. 5 shows how a web page can be displayed in a web browser including a dedicated platform 503 containing inserted content and conventional web content 502 according to one aspect of the invention.

FIG. 5 provides an example of an INE platform according to one variation of the invention. In FIG. 5, the client is a web browser 501, the response message is a web page 502, and the INE may be either an ISP or Proxy Server. It will be assumed that the INE is an ISP. The main web browser window 505 typically displays the response message. Therefore normally 502 would occupy all of 505. Instead, display area 505 according to one variation of the invention also contains an INE platform 503. In this embodiment, the browser display area 505 is actually displaying a frameset created by the ISP. A frameset divides a browser window into several "panes" and displays a different document inside each "pane." These "panes" are referred to as frames. In FIG. 5, the ISP intercepted the original response message from the server, and repackaged it into a two-frame frameset, placing the original response message in the bottom frame and an INE platform in the top frame. In this example, the content of 503 is controlled and driven by the ISP, and may be dynamic, changing constantly according to the specifications of the ISP.

According to one variation, platform 503 is placed at the top of the web browser window, and remains in its position regardless of whether the user scrolls up and down using scrollbar 504. Later, it will be described how platform 503 may remain in place even as the user navigates to other web pages. In addition it will be described how dynamic content in 503 may not be interrupted by the user scrolling or navigating to other web pages.

Figure 6:
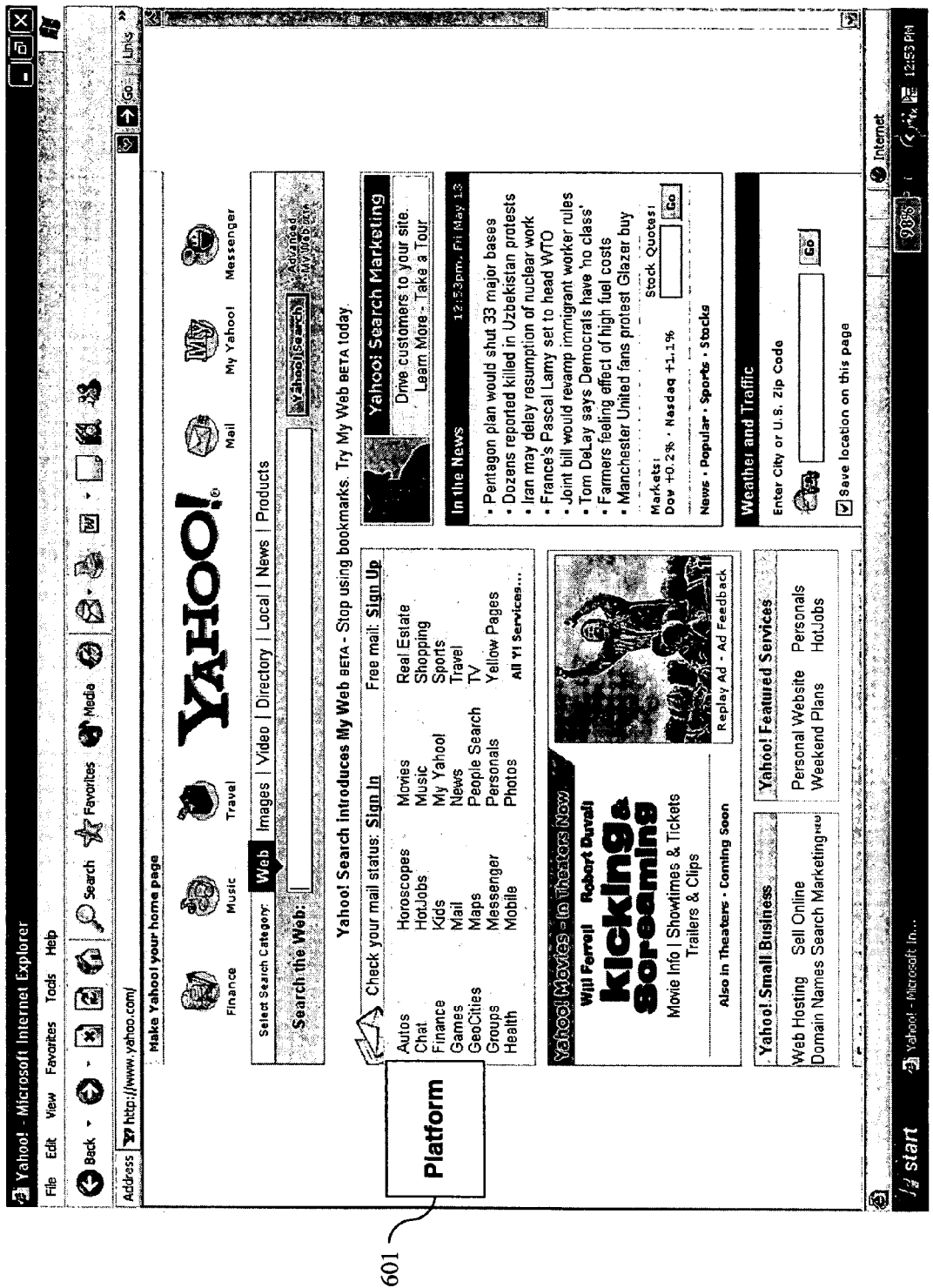
FIG. 6 shows how a web page can be displayed in a web browser including a dedicated platform 601 containing inserted content and conventional web content according to another aspect of the invention.

The INE platform shown in FIG. 5 is one form of an INE platform for the web browsing application according to one aspect of the invention. Other forms for the web browser platform include but are not limited to:

A floating object, such as is depicted in FIG. 6. The floating object 601 is superimposed over the browser window and remains in its place as the user scrolls vertically and horizontally, and also as the user browses to other web pages.

An object within the requested web page, including but not limited to a banner object. This may entail removing an existing object within the requested web page (e.g., a banner ad) and replacing it with the said object. Other forms of this object may include: (a) a Flash animation object; (b) a Java applet; (c) an ActiveX control.

A hyperlink placed anywhere in the web page.

Macromedia Flash animation that is superimposed on the web page.

A separate application window, whereby the application is fundamentally different from the browser application.

Inline frames (i-frames).

A custom toolbar similar to the Google and Yahoo toolbar.

In the case of the web browser being Internet Explorer, a band object similar to the commonly used "Favorites" and "Media" band objects. The band object is typically placed on the left side or the bottom of an Internet Explorer window.

A native component of the web browser application (in the same way that the main browser window and the drop-down menus are native component). This native component would be designed to provide an INE platform for and interact with an INE.

The concept of an INE platform is not limited to the web browsing application. It is also applicable to other client-server applications including but not limited to: email, streaming audio and streaming video.

For an email client, the INE platform may take forms including but not limited to:

A native component of the email client designed to provide an INE platform that may interact with an INE.

A frame within the email body, similar to 501, especially if the user's email client is equipped to display HTML content, which many of the email clients do.

A text message within the email body.

A graphic object within the email body.

For an audio player, the INE platform may take forms including but not limited to:

A native component of the audio player designed to provide an INE platform that may interact with an INE.

Interrupting and buffering the audio stream to play an audio message from the INE.

Superimposing or mixing audio on the audio stream.

For a video player, the INE platform may take forms including but not limited to:

A native component of the video player designed to provide an INE platform that may interact with an INE.

Interrupting and buffering stream to present own video content.

Superimposing an object on the video display—the object may be interactive.

The functionality of the INE platform may provide control features to the user, including but not limited to: (1) Changing background of the INE platform (in the case of a visual platform); (2) Changing the form of the INE platform (toolbar, frame, pop-up window); (3) Changing size of the INE platform (in the case of a visual platform); (4) Turning the INE platform on/off; (5) The physical position of the INE platform (in the case of a visual platform); (6) The amount of acceptable animation/movement/interactivity within the INE platform.

In general, the INE platform (for the different web-applications) may be implemented in exactly one or in a combination of at least three methods:

Method A: Network-side/server-side implementation. In this method no client-side installation is required. This implies that no software needs to be installed on the user's computer/device, beyond the existing client software (e.g., the web browser application). The presentation, control and maintenance of the INE platform are performed by a computer/server on the network side. It will be appreciated that Method A does not require client-side software installation, which facilitates the introduction and presentment of the INE platform to the user.

Method B: Installation and/or downloading of software on the user's computer/device to complement and/or extend the functionality of an existing client on the computer/device. An example of an existing client may be a generic web browser application. In this case, installed/downloaded client-side software results in the establishment of the INE platform, and subsequent coordination with the INE to control and maintain the content of the INE platform, including for example the user's location.

Method C: Building the INE platform into client. This entails implementing the INE platform in the native code of the client. For example, if the client is a web browser, it may have a built-in capability to present an INE platform to the user, in coordination and collaboration with an INE. In other words, the mechanism for establishing the INE platform would be part and parcel of the client's source code. Method C would apply for example if the INE platform were built into a web browser application.

Method A and Method B will be illustrated, by describing how they can be applied to the web browsing application, to implement certain forms of the INE platform for the web browser. Several elements of the description will be applicable to other forms of the web browser INE platform, as well as INE platforms for other client-server applications.

Figure 7:
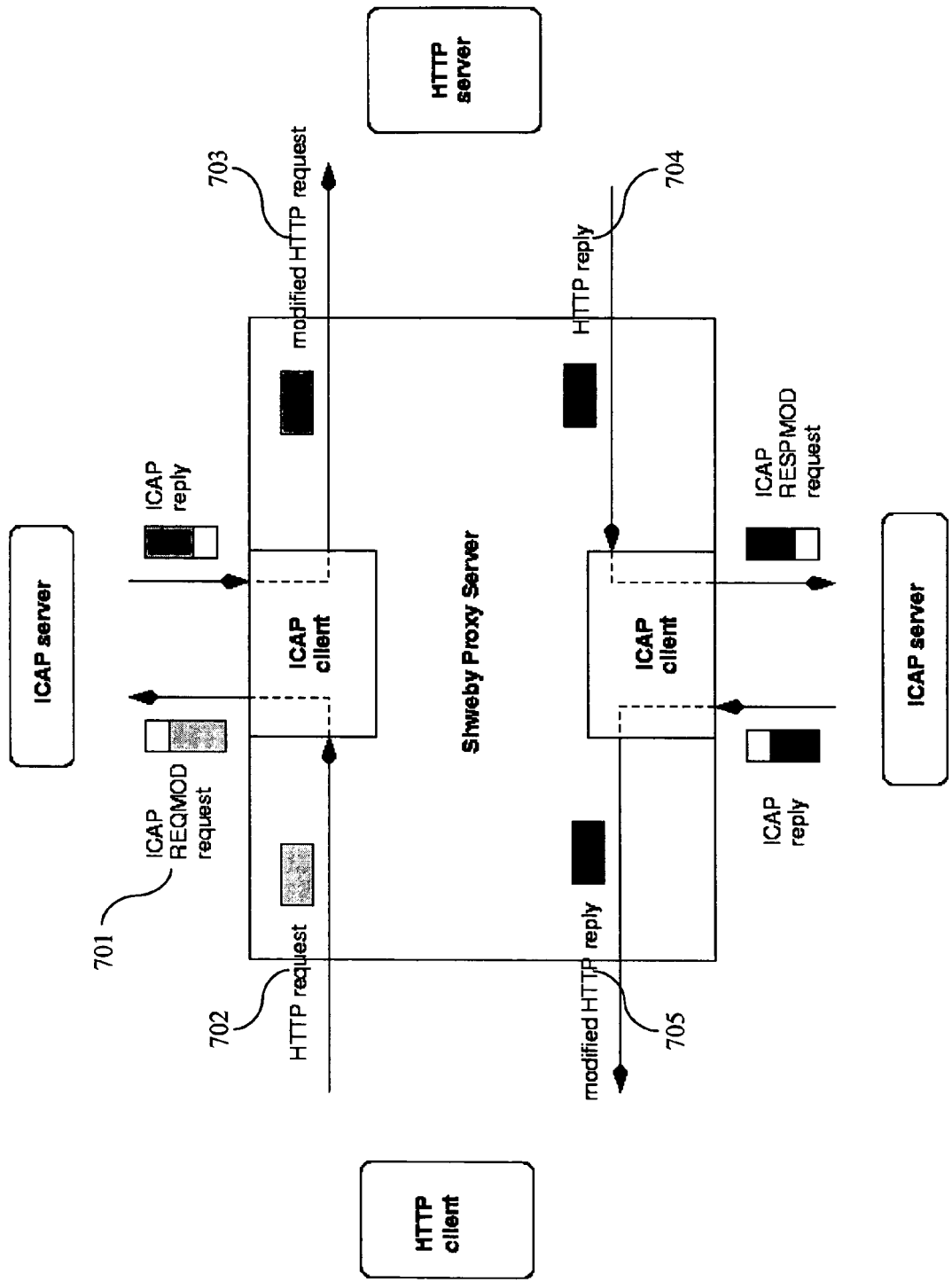
FIG. 7 shows conventional Internet Content Adaptation Protocol (ICAP) techniques.

As a precursor to describing Method A, the Internet Content Adaptation Protocol (ICAP) is introduced. ICAP is an existing open standards protocol for content adaptation. It is intended to allow web proxy servers to alter HTTP requests and HTTP (server) responses at the point where these messages move through the proxy server. Accordingly, ICAP is typically used at the network edge. ICAP applications include virus scanning and protection, fixed-banner advertisement insertion, child-protection filtering, wireless device support on plain websites, and language translation services. There are at least two widely available proxy servers that are ICAP-capable: the squid proxy server and the Shweby proxy server. FIG. 7 shows the enhancement of the architecture of the Shweby proxy server to support ICAP. There are at least two main modes of ICAP operation. The first is REQMOD (REQuest MODification) 701, whereby before the HTTP request 702 is sent out to the intended (origin) web server, it is modified by the ICAP server, and a modified HTTP request 703 is instead sent out to the origin web server. If the proxy server supports caching, then 702 may be modified pre-caching (i.e., while on its way into cache), or post-caching (i.e., on its way out of the cache). A second main mode of ICAP operation is RESPMOD (RESPonse MODification), whereby an HTTP response 704 from the origin web server is modified by the ICAP server before the modified HTTP response 705 is sent back the user's browser. Similar to HTTP request modification, HTTP response modification may occur before the HTTP response is cached, or on the responses way out of the cache heading back to the user's browser.

Figure 8:
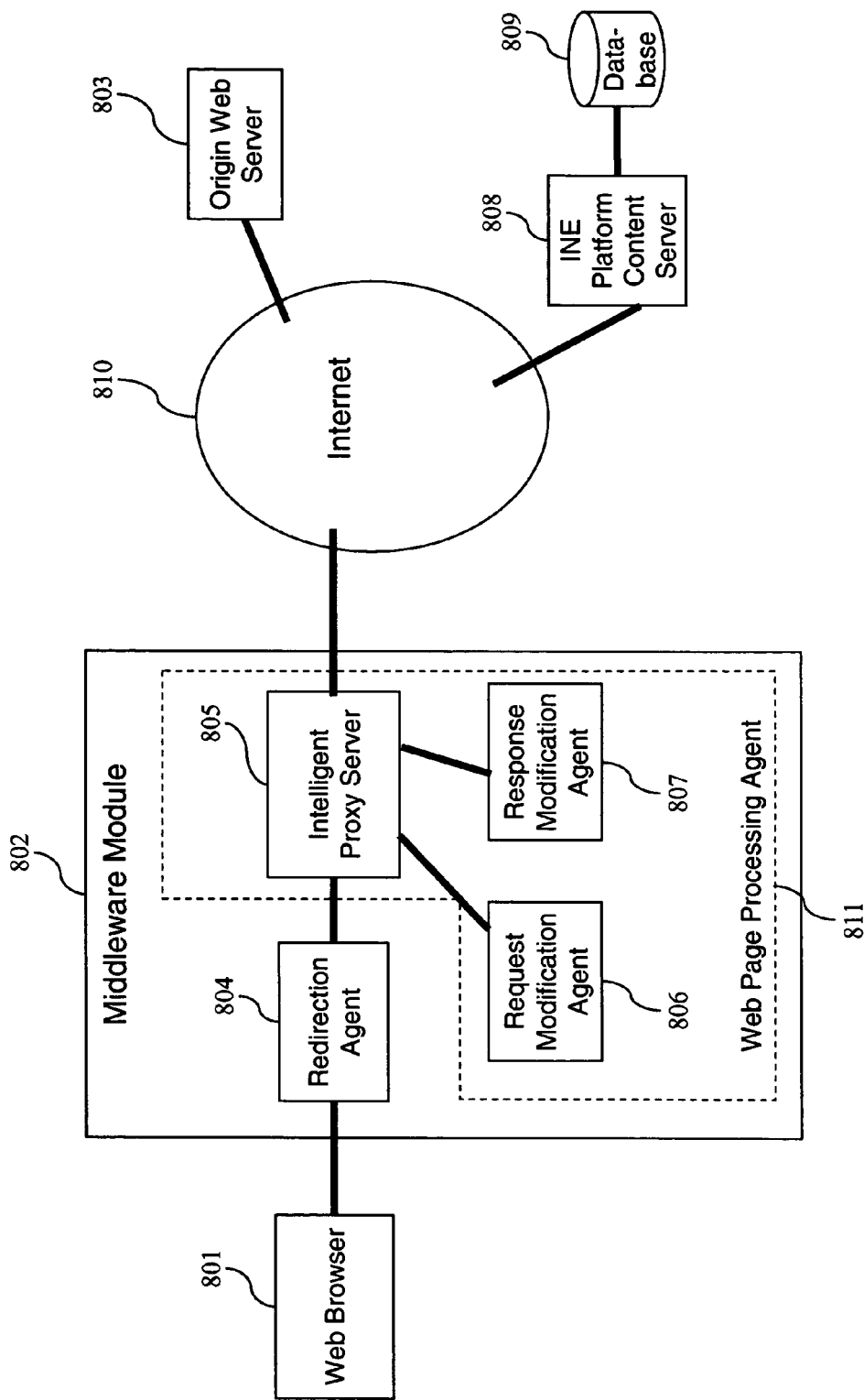
FIG. 8 shows one possible software architecture for carrying out the principles of the invention.

FIG. 8 shows one possible software architecture for carrying out the inventive principles according to Method A. Method A for the web browsing application may leverage ICAP. This general architecture is highly modular and flexible enough to be specialized based on the properties of the web browsing application 801 being used. The architecture can adapt to different web browsers (Internet Explorer, Firefox etc.) and different scripting languages (HTML, JavaScript, etc.). The centerpiece of the software architecture is the middleware module 802, which is located between the web browser 801 and the Internet 810. Module 802 may reside on the edge router of the INE responsible for establishing the INE platform. For example, module 802 may reside on the edge-router of the 1$^{st}$ order client ISP (304 in FIG. 3). Module 802 is responsible for creating and maintaining the INE platform, and comprises the following components: the redirection agent 804 and the web page processing agent 811. Agent 811 in turn comprises the following components: the intelligent proxy server 805, the request modification agent 806, and the response modification agent 807.

The redirection agent 804 may redirect certain IP datagrams received from the web browser 801 to a web page processing agent 811. Redirected IP datagrams may contain requests including but not limited to HTTP requests and HTTPS requests. (HTTPS is HTTP over TLS/SSL.) There are at least two methods for redirecting IP datagrams. The first method relies on redirecting them based on the port number for that data stream. Port 80 and Port 8080 are the typical ports used when a web browser makes an HTTP request to a web server. Port 443 is the port typically used when a web browser makes an HTTPS request. The Linux-based packet filtering tool, iptables, may be used to redirect IP datagrams based on the port number. However, not all HTTP requests use Port 80 or 8080. The second redirection method is to peek into the header of an IP datagram, which contains information about the protocol being used in the communication between the client and the server. If the protocol used indicates that the communication is for a web browsing client-server application, then the IP datagram may be redirected.

The IP datagrams may be redirected to the intelligent proxy server 805. As mentioned earlier, a proxy server typically re-initiates requests on behalf of the client and passes the corresponding response to the client. However, the intelligent proxy server 805 may first redirect a request to the request modification agent 806. Agent 806 may modify the header in the HTTP requests, before returning the modified request to proxy server 805, which may then send the modified request to the appropriate web server. Upon receiving the response corresponding to the modified request, proxy server 805 may forward that response to the response modification agent 807. The response modification agent 807 may add, delete, or modify the content of the response; and subsequently return the modified response to 805. Proxy server 805 may then forward the modified response to web browser 801. The modification agent 806 and the response modification agent 807, along with their interaction with the intelligent proxy server 805, may be implemented based on the Internet Content Adaptation Protocol. Indeed, the combination of 805, 806, and 807 may be implemented using the Squid proxy server with ICAP configuration or the Shweby proxy server with ICAP configuration.

The intelligent proxy server 805 also provides flexibility to either cache content for faster operation or not cache content at all.

The INE platform content server 808 serves the content offered by the INE for the INE platform. The database 809 stores user profile information and any state information required for maintaining, controlling and operating the INE platform. The web server 803 may be a generic web server which returns content based on the HTTP request it receives. In the most general case 808 and 809 communicate with 802 over the Internet. However, it is also possible that 802, 808 and 809 are on the same local area network, the same wide area network, or the same computer.

There are several alternatives for leveraging the core software architecture in FIG. 8 for the Method A implementation of an INE platform for a web browser. One aspect of the web browser which determines which alternatives are feasible/optimal is which web browser capabilities the user has enabled. For example, the user may elect to disallow cookies or the execution of Java applets for security purposes. More generally, the user has the flexibility to enable/disable at least the following: (1) rendering of JavaScript; (2) execution of Java applets; (3) execution of ActiveX controls; (4) allowing third-party plug-ins such as Macromedia Flash®, Adobe® PDF files, or RealPlayer®; and (5) allowing cookies.

Seven approaches belonging to Method A are described for implementing the web browser INE platform:

1—Approach 1: via a frameset, with the assumption that the web browser is only capable of rendering basic HTML.
2—Approach 2: via a frameset, with the assumption that the web browser is capable of rendering basic HTML as well as JavaScript.
3—Approach 3: a hybrid of Approach 1 and Approach 2.
4—Approach 4: a variant Approach 2 that handles HTTPS requests.
5—Approach 5: via a cascading style sheets (CSS).
6—Approach 6: via inline frames (i-frames).
7—Approach 7: via Java applets or ActiveX controls.
8—Approach 8: via Macromedia Flash® or similar third-party plug-ins.

Figure 9:
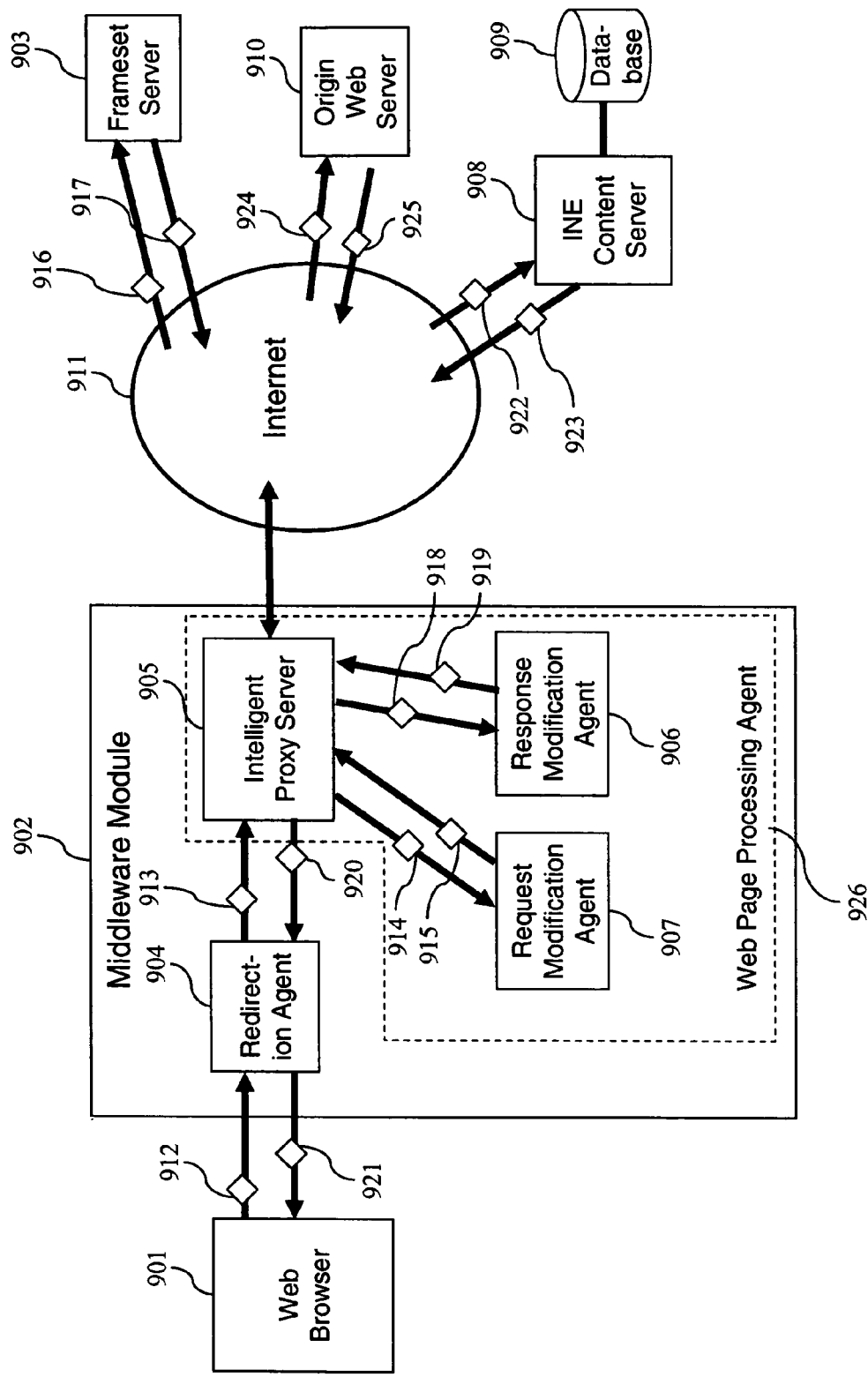
FIG. 9 shows details of processing steps that can be performed according to one variation of the invention.

Reference will now be made to FIG. 9, which describes Approach 1 in more detail. In this architecture, the middleware module 902 controls the setting up of a frameset, whereby one frame contains the original response from the origin web server 910, and the other frame contains the INE platform. Setting up the frameset the first time is a relatively simple task, but it can be more complicated to maintain the frameset correctly. Correct maintenance of the frameset includes having exactly one INE platform frame. This is complicated for the following reason: if a user clicks on a URL link in one of the frames, then normally the resulting response will be displayed in the same frame without destroying the frameset. On the other hand, if the user enters a URL in the URL address box, then normally the frameset will destroyed before the response is displayed. Module 902 may detect whether a request resulted from clicking on a URL by "flagging" embedded URLs, including those associated with the tags src and href, in previously returned responses. Flagging an embedded URL may occur by modifying the URL in a manner that indicates that it was indeed modified while simultaneously allowing for recovering the original URL from the modified URL. One way of flagging embedded URLs is to have the response modification agent replace each embedded URL with a unique alias URL. For example, http://www.cnn.com may be replaced with http://192.168.5.25. The response modification agent may write the associated pair of http://www.cnn.com and http://192.168.5.25 into a lookup table (e.g., a flat file). The lookup table will also be accessible by the request modification agent 907. Relative URLs may need to be expanded to their full form before being stored in the lookup table. The IP addresses used for aliasing may be private IP addresses in a range that is reserved for aliasing URLs. The web page processing agent 926 may determine that a URL was previously flagged if that URL contains an IP address in the range of the IP addresses reserved for aliasing. Agent 926 may retrieve the original URL from the lookup table. Another way of flagging a URL is to append a suffix to it in the form of a query string. For example, http://www.cnn.com may be flagged by modifying it to http://www.cnn.com?FRAMESET=ON. The variable in the query string may have a unique name reserved for flagging URLs. The original URL may be retrieved by stripping the suffix.

Module 902 may create a new frameset or simply return the requested web page content into an existing frameset, based on whether the request is flagged or not.

The message flow in FIG. 9 is described in detail below, assuming that the flagging is implemented by appending a suffix to the embedded URL.

An initial HTTP request 912 for web content (e.g., http://www.cnn.com) is sent from the web browser 901. Request 912 goes through the redirection agent 904 and is redirected (913) to the intelligent proxy server 905. Proxy server 905 sends an HTTP-request-modification request 914 to the request modification agent 907. Agent 907 tests to see if the requested URL has been previously flagged or not. Request 912 will not be flagged in at least two cases: when the user initiates a right-click-open or enters a new URL in the address box.

The following steps explain the subsequent message flow if the URL has not been previously flagged. If request 912 is not flagged, then a new frameset needs to be set up. Again using http://www.cnn.com as an example, 907 may modify the request to http://192.168.100.1/framesetserver?ORIGINAL-URL=http://www.cnn.com, where 192.168.100.1 is the IP address of the frameset server 903. (The IP address 192.168.100.1 is a private IP address, which is indicative of 903 in this case being on the same local area network as the middleware module 902.) The frameset server is a web server that is controlled by the INE. The modified request 915 is returned to 905. Proxy server 905 sends the request to 903. As a web server, 903 parses the request 915, and invokes a module (e.g., a Python module), that generates a response web page consisting of a two-frame frameset with two embedded URLs. The embedded URL for the top frame may be http://192.168.100.2/topframe.php, where 192.168.100.2 is the IP address of the INE content server 908. (The IP address 192.168.100.2 is a private IP address, which is indicative of 908 in this case being on the same local area network as 902.) The embedded URL for the bottom frame may be http://www.cnn.com?FRAMESET=ON. The frameset response 917 is returned to proxy server 905, which may be configured to allow any response from 192.168.100.1 or 192.168.100.2 (903) to pass through unmodified. Similarly, 905 may be configured to allow any request to 192.168.100.1 (908) or 192.168.100.2 (903) to pass through unmodified. With 905 configured to pass through any responses from 903, 917 is forwarded (920) to 904, which in turn may be configured to allow all responses to pass through. Hence 920 is forwarded (921) to 901. Receiving the two-frame frameset, 901 will initiate two requests corresponding to the two embedded URLs. The first request, destined for 908 may pass through 905 unmodified. The resulting response 923 passes though (920, 921) to 901 unmodified. The second request, http://www.cnn.com?FRAMESET=ON, is flagged.

The following explains the steps if the request was previously flagged. If the initial HTTP request 912 is flagged, then the request modification agent 907 will strip the flag and return the modified HTTP request 915, which is forwarded as a web content request 924 to the origin web server (i.e., the web server originally requested) 910, e.g., http://www.cnn.com. Request 912 will be flagged in at least once case: when the user left-clicks on a link in a previously processed web page. Origin web server 910 returns an HTTP response 925 containing the requested content (e.g., CNN web content). The intelligent proxy server 905 receives the HTTP response 925. Proxy server 905 sends a request for HTTP response modification 918 to the response modification agent 906, which appends flags to every tag inside the content of the web page. These tags are primarily links ('href src=' tag) and images ('img src=' tags), but may also include calls to remote scripts and frames. All of these elements are flagged by appending a query-string to the end of their URLs. These flags are indicators that the subsequent embedded HTTP requests should not create new a frameset. Agent 906 returns the modified HTTP response via 919 to the intelligent proxy server 905, which in turn forwards the modified HTTP response via 920 to the redirection agent, which in turn returns the modified HTTP response via 921 to the web browsing application 901, which displays or otherwise renders it.

Modifications to requests and responses may be performed by using regular expressions in PERL or Python. Also, an alternative way to flag URLs is to append a prefix flag instead of a suffix. However, using a suffix may be easier to implement. In a prefix approach, there are numerous subtle issues involved in changing the HTTP headers (for example, the 'Host' attribute) to make a distinction between the actual requested URL and the prefixed URL. Suppose a URL is flagged by adding a prefix to it (e.g., http://192.168.100.4?URL=www.cnn.com). The HOST attribute may need to be changed from 192.168.100.4 to www.cnn.com to ensure correct operation.

To summarize Approach 1 at a high level, if the initial HTTP request 912 was flagged, then the HTTP response 925 containing the requested web content will be displayed into the existing frameset. On the other hand, if the initial HTTP request 912 is not flagged, then first an HTTP response 917 containing a new frameset will be loaded, which in turn automatically initiates a second round of HTTP requests for the contents of the two frames. The request for the web content (e.g., http://www.cnn.com) is flagged and goes through the same steps as before, returning 925. The request for the INE platform content may also be flagged and goes to the INE content server 908, which returns the INE platform content 923.

One advantage of Approach 1 is that although the requested web page's source HTML script is altered (through appending flags to URLs), the display/presentation of the document in the web browser is not altered. A second advantage for Approach 1 is that it only assumes HTML script rendering capability on the part of the web browser. As such, Approach 1 works regardless of what additional browser capabilities the user may or may not have enabled (e.g., JavaScript rendering). However, Approach 1 may have at least one drawback. If a user right-hand clicks on a link and selects "Open in New Window", then the new browser window will not contain an INE platform. Another disadvantage of Approach 1 is that if embedded URLs are constructed through concatenation within JavaScript code, then the flagging of embedded URLs may not occur cleanly.

It may be advantageous to have the flexibility to handle diverse web browsers. There are subtle differences between different web browsers. One such difference is that Internet Explorer implements strict caching rules which override no-caching commands embedded inside web pages (Mozilla and Netscape do not have this problem.). This local storage of web page content conflicts with the objective of creating a persistent platform. One approach for solving this problem is to appending a random string to the end of every requested URL, which convinces the Internet Explorer browser to initiate a new HTTP request. For example, when flagging http://www.cnn.com, it is flagged as follows: http://ww.cnn.com?RAND=823439, where "823439" is a randomly generated string. Internet Explorer has a similar issue with image-based Remote Procedure Calls (RPCs). The content of the INE platform may be updated by constantly issuing image-based RPCs to the INE content server, as opposed to page-refreshes, whereby the web browser targets an image, and the response is an image of two possible dimensions, indicating whether the state of the content of the platform has changed or not. With Internet Explorer after the first RPC, caching kicks in, and instead of the web browser issuing any further RPCs, it incorrectly reverts to a cached version of the dummy image. This may be solved by appending a new random string to the end of the image URL in every RPC, which tricks Internet Explorer into believing that every RPC is a request for a new image, thus correctly issuing the RPCs.

Figure 10:
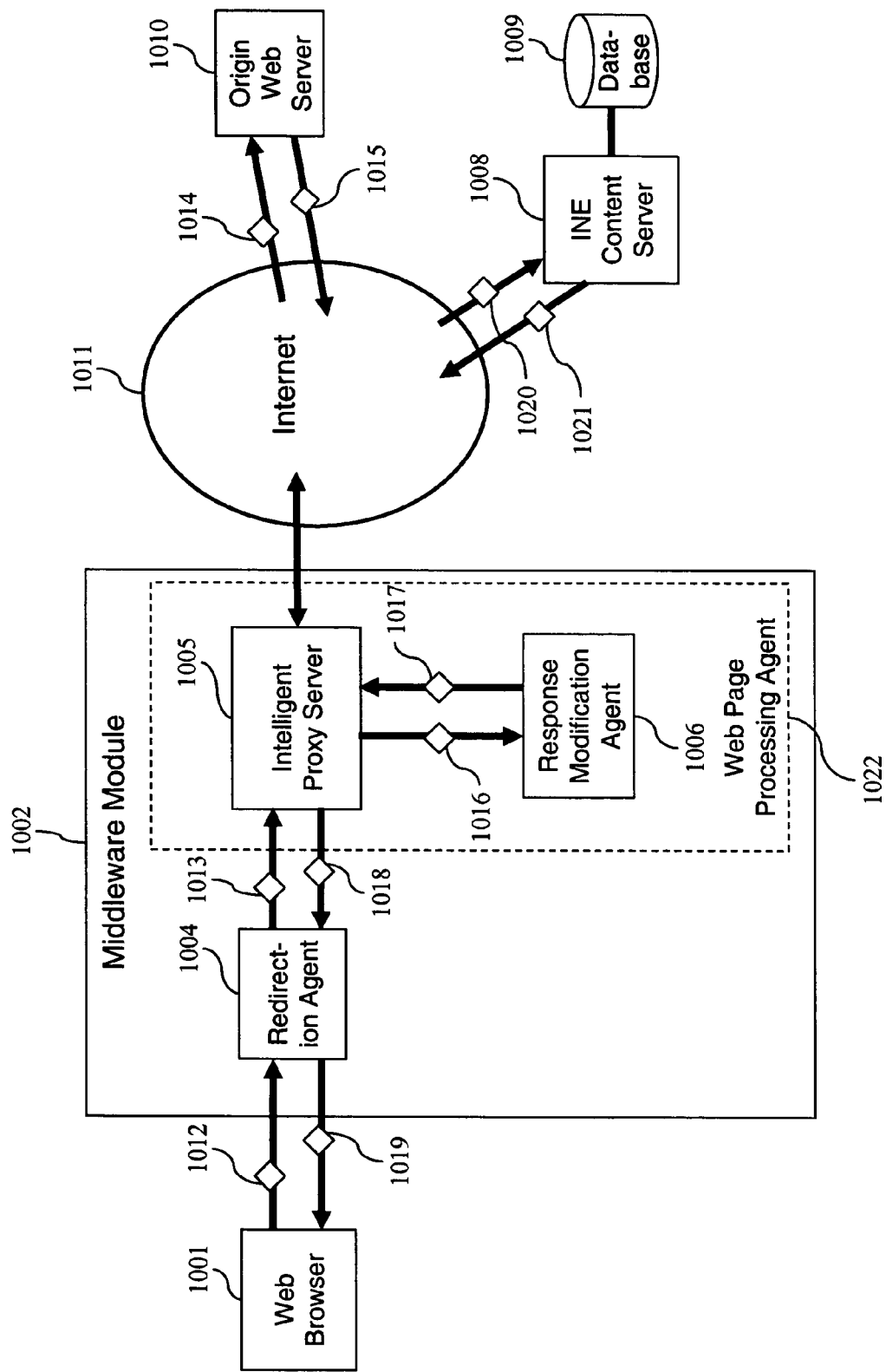
FIG. 10 shows details of processing steps that can be performed according to another variation of the invention.

Reference will now be made to FIG. 10, which describes Approach 2. FIG. 10 shows details of processing steps that can be used to implement the invention under the assumption that the user's web browser is capable of rendering both HTML and JavaScript.

JavaScript is a client-side scripting language which allows real-time applications to run on the web browsing application 1001. According to one variation of the invention, the architecture uses JavaScript to test for the presence of a frameset in the web browser 1001 and to create a new frameset, if necessary. In essence, JavaScript replaces the previous approach's framework of flags and the frameset-creating server with a relatively straightforward piece of JavaScript code.

The message flow in FIG. 10 is as follows. An initial HTTP request 1012 (e.g., http://www.cnn.com) is sent from the web browser 1001. The initial HTTP request 1012 is redirected to 1013, via a redirection agent 1004, and sent to the intelligent proxy server 1005, which forwards the (unmodified) HTTP request 1014 to the origin web server 1010, which in turn returns an HTTP response 1015 containing the requested content (e.g., http://www.cnn.com). Proxy server 1005 forwards 1016 to the response modification agent 1006, which encapsulates the response 1015 into the following JavaScript code:

```
<HTML>
    <SCRIPT language="javascript">
        if (top == self)      // i.e., if there is no frameset present
        {
            document.write('<FRAMESET>
                <FRAME SRC="platform-url" >
                <FRAME SRC="requested-url">
            </FRAMESET>');
        }
        else
        {
            document.write('...content of the HTTP response from origin web server 1015...');
        }
    </SCRIPT>
</HTML>
```

Accordingly, the JavaScript code (a) checks for the presence of a frameset; (b) if no frameset exists, it will create a frameset with the appropriate URLs for the content frame and the INE platform frame; (c) otherwise it will simply write the content of the HTTP response 1015 into the existing frameset. Agent 1006 returns the modified HTTP response 1017 back to 1005, which forwards the modified HTTP response 1018 back to 1004, which in turn returns the modified HTTP response 1019 back to the web browser 1001. The web browser 1001 loads the JavaScript code. Per the pseudo-code provided above, if it is determined that a new frameset needs be created, then 1001 initiates an HTTP request to 1008 which is the same request that was initiated in (1). The request and response for the INE platform content proceed along the same path as before, but since the frameset is already established the second time around, the request will not be initiated again.

Proxy server 1005 may alternatively create a frameset in which it directly writes the content into each frame using JavaScript. This may be done to avoid the extra round of HTTP requests normally required by when a new frameset is set up, whereby each frame source is requested separately. A second round of HTTP requests may also be avoided by using a combination of flagging URLs with the establishment of a frameset using JavaScript.

Unlike Approach 1, in Approach 2 if a user right-hand clicks on a link and selects "Open in New Window", then the new browser window will contain an INE platform.

In both Approach 1 and Approach 2, the URL address box remains static when the user links through web pages. As a result, bookmarking will not function in the same way they would in the absence of a frameset-based INE platform. Furthermore in the case of Internet Explorer, the navigation buttons (Back and Forward) may not function properly. One solution to this problem is to implement and maintain custom (Back and Forward) navigation buttons in the frameset. This is a technique that is employed by some web content providers who display their content in frames. Unfortunately, custom navigation buttons may be unnatural for a user, and moreover do not avoid the bookmarking problem. Another approach to address this issue is to use JavaScript code to modify the navigation history of the web browser.

Both Approach 1 and Approach 2 may need to contend with frame-breaking scripts that some web pages include. Some web sites avoid being "framed" in an enclosing frameset by including their own frame-breaking JavaScript code. This may be done using the following JavaScript code to set the topmost frame's current location to the value of the page that should not be framed:

```
<script type="text/javascript">
<!--
function frameBuster(
{
    if (window != top)
        top.location.href = location.href;
}
window.onload = frameBuster;
// -->
</script>
```

Frame breaking scripts tend to leverage the reference to "top" to determine if the web page is enclosed in a frameset. One possible solution to avoid having the INE platform frame broken, is to (1) name the frame in which the web page is placed "content", using the name attribute of frame i.e., <frame . . . name="content" . . . >; and (2) to replace any reference to "top" in the downloaded web page's scripts with "content".

Frame-breaking may be also avoided by parsing and filtering out such frame-breaking scripts in the response modification agent 1006. Since many frame-breaking scripts are JavaScript-based, if JavaScript is not enabled on the user's browser the frame-breaking JavaScript code will not function. Moreover, in some variations both Approach 1 and Approach 2 may need to contend with compressed/gzipped web pages. Some web sites return content as a compressed file. The middleware module 1002 may be made capable of decompressing this content in order to perform the response modification filtering. In particular, 1002 may employ a proxy server 1005 that is capable of decompressing files. If necessary, 1002 may re-compress the content before returning it to the web browsing application 1001.

Approach 3 is a hybrid of Approach 1 and Approach 2. The main advantage of Approach 3 is that it addresses the the static URL address box issue, which is an issue with Approaches 1 and 2. The architecture for Approach 3 is the same as the architecture shown in FIG. 9, but without the frameset server 903. In Approach 3, a response 925 from the origin web server is forwarded to the response modification server 906. The first step in 906 is to is append any embedded URL with an src attribute with the suffix "?EMBEDDED=ON". The second step is to embed the response in the JavaScript code used Approach 2. In terms of requests emanating from 901, any request with the suffix "?EMBEDDED=ON" has its suffix deleted in 907, and the corresponding response to that request is allowed to pass through 905 without being forwarded to 906. To summarize, Approach 3 is a brute-force method that sets up a new frameset for every downloaded web page, regardless of whether the web page was requested e.g., left-hand clicking on a link, entering URL address in address box etc. In Approach 3, the web browser's address box is continually updated with the current URL.

Figure 11:
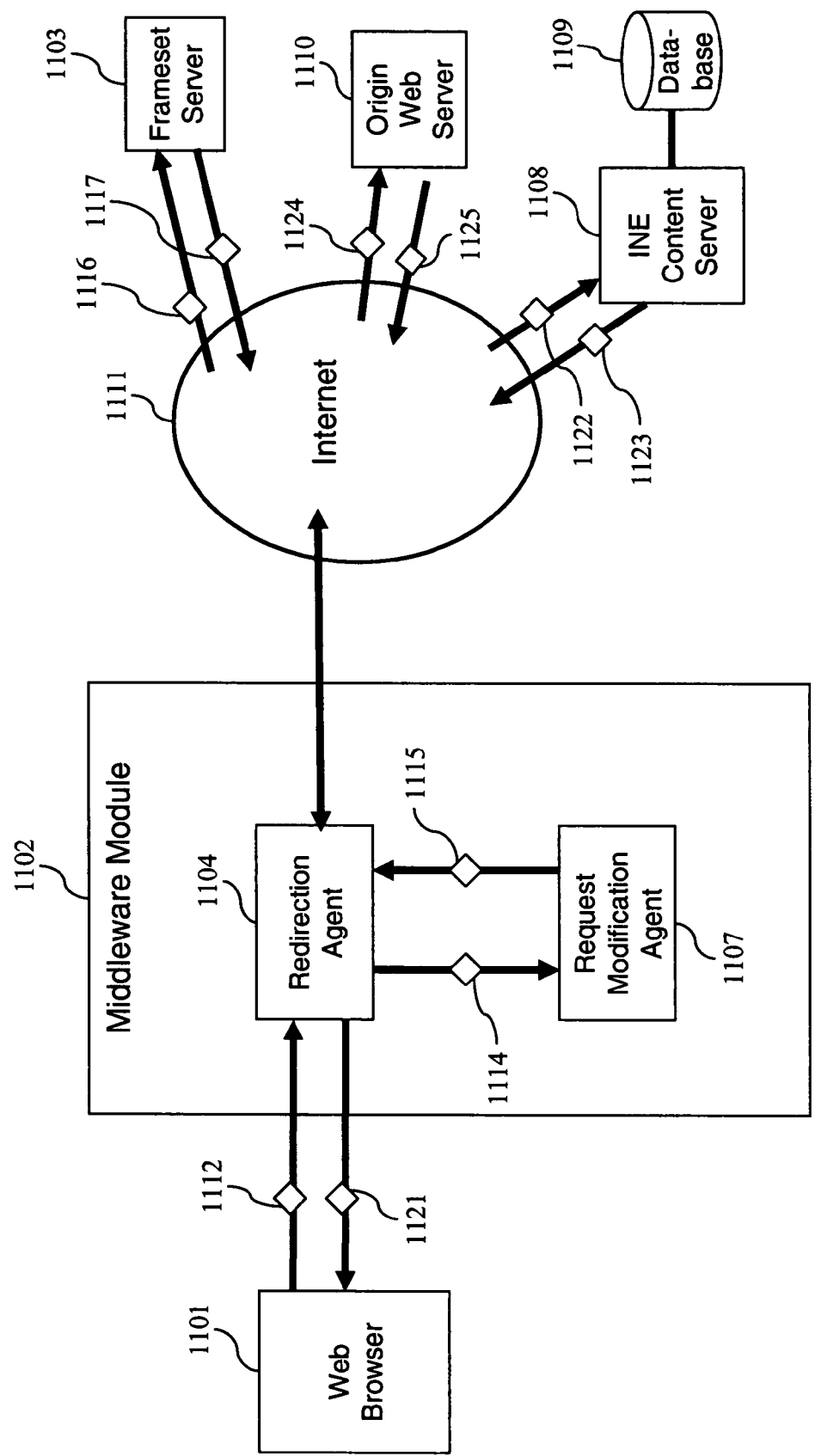
FIG. 11 shows details of processing steps that can be performed according to yet another variation of the invention.

Approach 4 is also a variant of Approach 2. The advantage of Approach 4 is that it has the capability to handle HTTPS requests and responses. The previous approaches rely on the ability to modify the response from the origin web server. However, HTTPS responses are by construction encrypted. FIG. 11 depicts an architecture and steps for Approach 4. When an HTTPS request 1112 is initiated (e.g., https://www.bank.com), the redirection agent 1104 recognizes it is an HTTPS request and redirects it to the frameset server 1103, which in turn returns a web page containing (a) a JavaScript code which breaks out of any existing fiameset on the user's browser, to ensure that no more than one frameset is displayed; and (b) a frameset containing 2 frames: a top frame with a source pointing to the INE content server, and a bottom frame with a source pointing to the requested secure URL with a suffix e.g., https://www.bank.com?SECURE=ON. When the web page is returned to the web browser 1101, the latter initiates one request for the NE platform content, and another for the bottom frame, namely https://www.bank.com?SECURE=ON. This time around the suffix is stripped before the request is sent (1124) to the origin web server. The response 1125 is returned to 1101 unmodified, where it is displayed in the bottom frame. Approach 4 may not work 100% correctly, if the response to the HTTPS request is itself a frameset-based web page.

Approach 5 leverages Cascading Style Sheets (CSS). CSS is a simple mechanism for adding style (e.g. fonts, colors, spacing) to web documents. CSS may be leveraged to create a platform by beginning with a basic HTML table element and using CSS to fix the table's position in the web browser window. FIG. 10 serves as the architecture for Approach 5. For Approach 5, 1006 may modify the response by inserting the CSS-based code into the response. The resulting CSS element is inserted into the content of each web page displayed on the user's web browser. The CSS element may be positioned at the top of the browser window and made to span its entire width to emulate a frame, such as the one 503 shown in FIG. 5. Alternatively, its width may be reduced, and its position may be fixed to give the look-and-feel of a floating object, such as the one 601 shown in FIG. 6. Approach 5 may be implemented by first inserting into <HEAD> of the requested page the following, which fixes the position of the platform:

```
<style type="text/css">
    ...fix position of object id="platform"...
</style>
```

Second, the following may be inserted into the <BODY> of the requested page to describe the actual content of the platform:

```
<div id="platform">
    ..platform content...
</div>
```

There may be some drawbacks to Approach 5. First, CSS language itself is not supported by older versions of web browsers. Second, it may be preferable that the INE platform appear fixed, even when the user scrolls up and down. Sophisticated HTML techniques, some of which are not supported by all web browsers, may be needed to achieve this. Since the platform is injected in the actual content of the web page requested by the user, the platform will appear as part of the web page whenever the user prints or saves the content. This is not a problem for frameset-based approaches, because in those approaches, the requested web page is separated from the INE platform by being in a separate frame.

Approach 6 leverages inline frames. An inline frame (i-frame) is a frame which is placed directly inside the content of a web page. There are at least two possible flavors for Approach 6. The first is the platform-inside-content flavor. In this case, the INE platform resides inside the i-frame, and the requested content is displayed in the surrounding web browsing window. This is similar to the CSS approach, and therefore shares similar advantages and disadvantages. In this case, the response from the origin web server is not "framed", and therefore the approach does not suffer the inherent frame navigation problems discussed earlier. However, one possible disadvantage is that the i-frame platform does not stay fixed. The second flavor is the content-inside-platform flavor. In this case the requested content is placed inside the i-frame, and the platform is displayed in the surrounding web browsing window. One advantage to this flavor is that the persistence of the INE platform is automatically ensured because the platform remains visible in the background while the content scrolls in the i-frame. One disadvantage however, may be that the response from the response from the origin web server is framed, implying that it may be susceptible to all the inherent frameset problems (e.g., frame-breaking web sites, navigation problems, etc.). This flavor may be implemented by writing the platform directly into the page, while the requested URL is inserted as an iframe:

```
<HTML>
    <BODY>
        ...insert platform content here...
        <iframe src="requested-url"></iframe>
    </BODY>
</HTML>
```

Approach 7 is similar to Approaches 5 and 6, in that 1006 may modify the response by inserting a Java applet or an ActiveX control into the response. The Java applet or the ActiveX component may instantiate a platform within the web page. The Java applet or the ActiveX component may be developed using standard programming.

Similarly, Approach 8 may leverage 1006 to insert a third-party plug-in object, such as Flash animation object, into the response. The third-party plug-in object may subsequently instantiate a platform within the web page.

In all approaches belonging to Method A, the continuity of the content of the INE platform may be maintained, even as the user navigates from one web page to another, by maintaining the state of the user in a database (809 in FIG. 8) that may be coupled to the INE content server. As such, even though technically a new platform may be reconstructed, by loading the state of the platform from the state database, the appearance of continuity can be established. State may also be maintained using cookies, however that may be intrusive, and also may be prevented by the user. Furthermore in all approaches belonging to Method A, the web browser on the user's computer may be discouraged/prevented from caching web pages by inserting the following in the <HEAD> of the requested web page:

```
<META Http-Equiv="Cache-Control" Content="no-cache">
<META Http-Equiv="Pragma" Content="no-cache">
<META Http-Equiv="Expires" Content="0">
```

Figure 12:
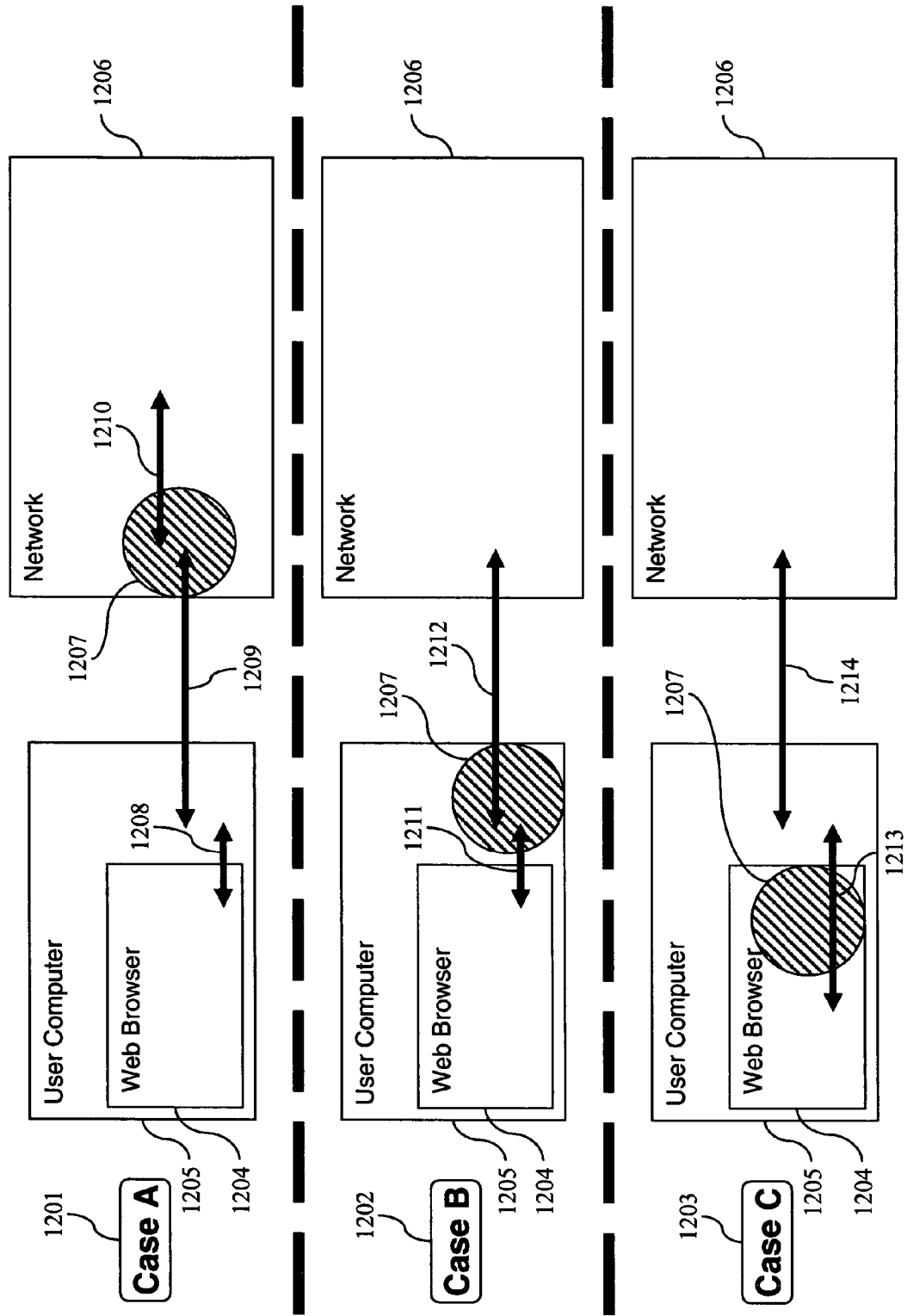
FIG. 12 illustrates how server-side software may be placed on the user's computer 1205 or incorporated into the web browser application 1204 itself.

It will be appreciated that although the architectures in FIG. 8, FIG. 9, FIG. 10, and FIG. 11 were designed with the intention of them being located at the edge of the network, it is also possible that the corresponding software be on the user's computer. FIG. 12 illustrates how the server-side software may be placed on the user's computer. 1207 is software that may be developed based on one or more of the architectures in FIG. 8, FIG. 9 FIG. 10, and FIG. 11. Case A 1201 depicts the case where 1210 resides at the edge of the network. The web browser 1204 exchanges messages 1208 with the user's computer 1205, which in turn exchanges messages 1209 through 1207, which in turn exchanges messages 1210 with the network 1206. In Case B 1202, 1210 is placed on the user's computer. Messages from/to 1204 (i.e., 1211) go through 1207, which in turn exchanges messages 1212 with the network. In Case C 1203, 1207 is place directly in 1204. Therefore, 1207 may be part of the source code of the web browser 1204 or a controlled web browser plug-in/patch. In 1203, messages to/from the core web browser functions pass through 1207. 1207 in turn exchanges messages 1213 with 1205. 1205 in turn exchanges messages 1214 with 1206.

Although the example of a web page is used above, the inventive principles may be applied to other web content, such as audio data, video data, audiovisual data, etc. The INE platform may comprise for example an INE-controlled audio stream that is mixed with or interrupts an existing audio stream constituting the desired web content. Known methods of mixing or splicing audio data can be used. The INE platform may comprise INE-controlled video data that is superimposed over or interrupts an existing video stream constituting the desired web content. Other forms of content can similarly be mixed with the desired web content according to various principles of the invention.

It will also be appreciated that the INE platform can implemented using client-side installation (Method B), should the client elect to download and/or install software. Four approaches are described for Method B.

Approach 1: Placement of any of the Method A solutions described above on the user's computer, or within the user's browser, per the description for FIG. 12.

Approach 2: The use of explorer bars (band objects).
Approach 3: The use of a third-party custom toolbar.
Approach 4: Custom-built web browser. This includes a custom-built emulation of a generic web browser, which may be performed by encapsulating a generic browser within a larger application that becomes the new web browser.

Figure 13:
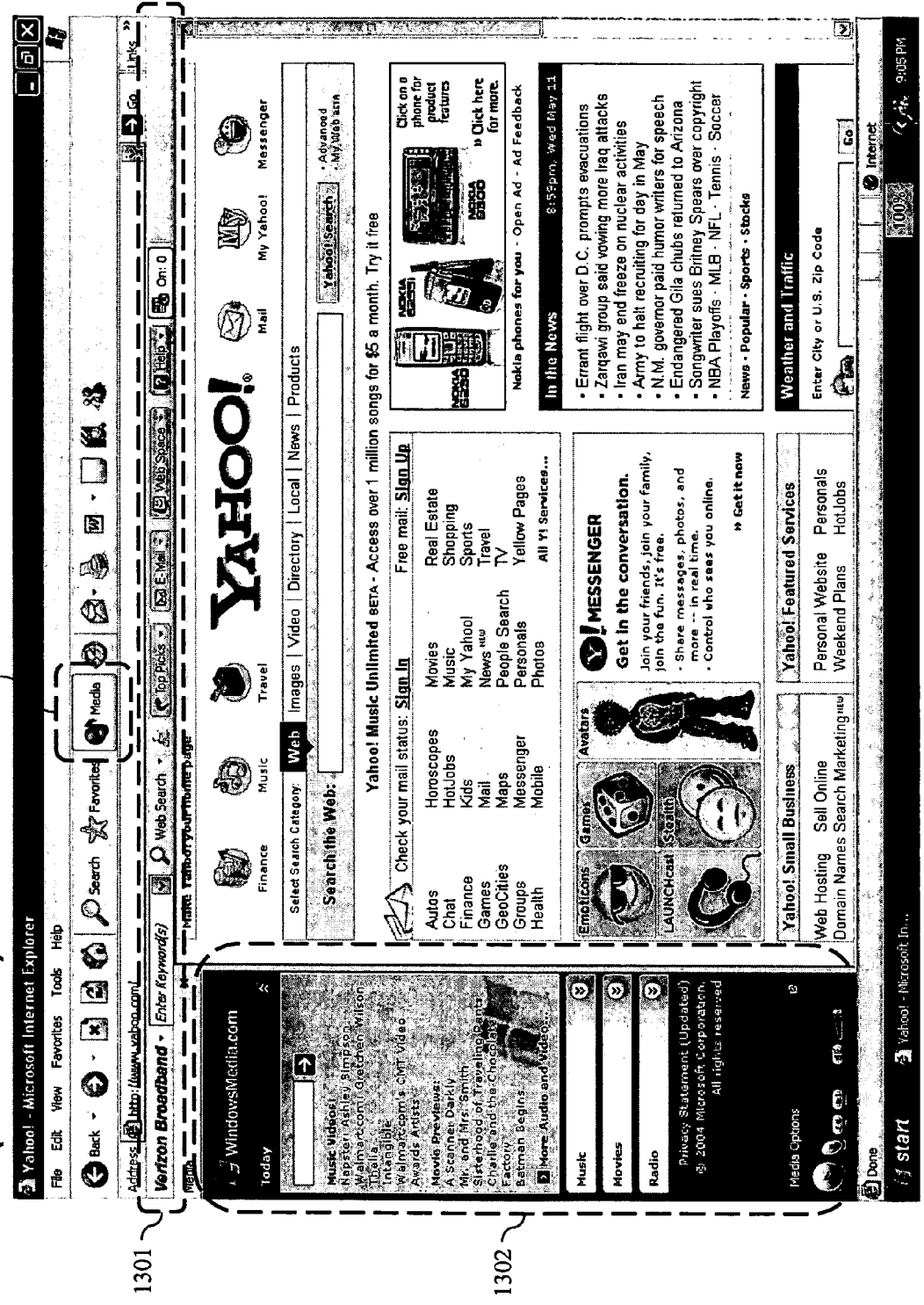
FIG. 13 shows the use of a conventional band object 1302 and a conventional toolbar 1301.

In terms of Approach 2, FIG. 13 shows an example of an explorer bar 1302. The explorer bar was introduced with Microsoft Internet Explorer 4.0 to provide a display area adjacent to the browser pane. It is basically a child window within the Internet Explorer window, and it can be used to display information and interact with the user in much the same way. Explorer bars are most commonly displayed as a vertical pane on the left side of the browser pane. However, an explorer bar can also be displayed horizontally, below the browser pane. The intended purpose of an explorer bar is to make it easier for the user to perform common web browsing tasks. As such, Internet Explorer provides several standard explorer bars, including "Favorites" (to access bookmarked websites) and "Search" (to perform Internet search). 1302 provides an example of an explorer bar, namely "Media", whose purpose is to facilitate playing streaming audio and video. The technical name for an explorer bar is a band object, which is the term used henceforth. A band object allows a user to open a sub-window within Internet Explorer, and to run complex/advanced applications within that sub-window. The band object 1302 has a "Media" button associated with it. Clicking that button allows the user to open and close the band object. However, it is not necessary to have a button associated with the band object. The band object can also be opened/closed from the "explorer bar" submenu of the View menu. In Approach 2, a custom INE explorer bar may be introduced to the web browser (with or without an associated button), through a software download/installation. The INE explorer bar will in effect be the INE web browser platform whereby the complex/advanced application within the INE explorer bar will establish and manage the content of the platform in coordination with the INE.

Approach 3 involves leveraging custom third-party toolbar technology. This technology is currently available for at least Internet Explorer and Firefox. In recent years, Internet portals have increasingly relied on custom third-party toolbars to provide quick to access to their services for their online users. FIG. 13 shows Google's (www.google.com) implementation of the toolbar 1301. Similar to Approach 2, a custom INE toolbar may be introduced to the web browser, through a software download/installation. The INE toolbar will in effect be the INE web browser platform whereby the script within the INE toolbar may establish and manage the content of the platform in coordination with the INE. Verizon Broadband, which as an ISP qualifies as an INE, has a toolbar implementation as shown in FIG. 13. However, Verizon's toolbar services are similar to a typical Internet portal's toolbar, and do not appear to leverage any knowledge Verizon may uniquely have about the user such as the user's location.

Figure 14:
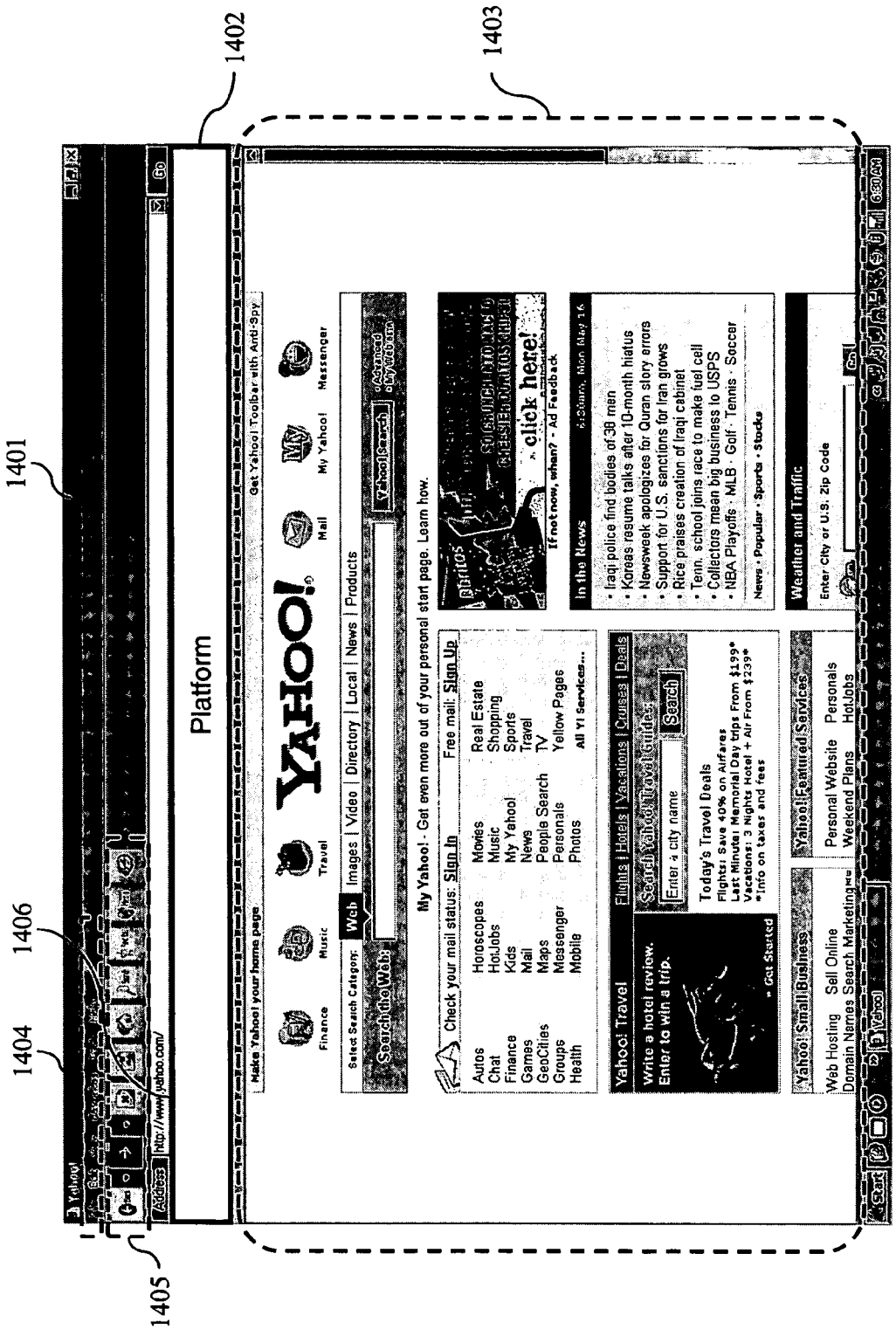
FIG. 14 shows a custom-built browser that incorporates various principles of the invention.

In terms of Approach 4, a web-browser may be custom-built using existing software components for generic web-browsers as building blocks (also be referred to as reusing software components). A custom web-browser may be capable of performing specific functions that are not performed by a generic web-browser. FIG. 14 depicts one possible custom web-browser 1401, which is built by reusing Microsoft software components, including Internet Explorer components. Indeed the main browser window 1403 is the same main browser window used in generic Internet Explorer. However, other elements of a typical web browser application such as menu controls 1404, application controls (1405), and the url address box 1406 may be reconstructed. FIG. 14 also depicts a dedicated area within the custom web-browser 1402 that may be used to host a wide range of INE platform applications. Since the web-browser as a whole is custom-built, the applications hosted within 1402 may be developed using powerful programming languages such as C++. As such, with a custom web browser the INE may have more flexibility in the range and type of services presented through the INE platform, than it would with using a custom third-party toolbar or a band object/explorer bar. The different elements of the custom web-browser in FIG. 14 (1402, 1403, 1404, 1405, and 1406) may be pieced together using Microsoft .NET Framework. 1401 may be implemented as a Windows Forms application. Windows Forms are the building blocks of traditional graphical programs designed for the Windows operating system—applications from Microsoft Word to interactive games and multimedia products may be considered Windows Forms applications.

Figure 15:
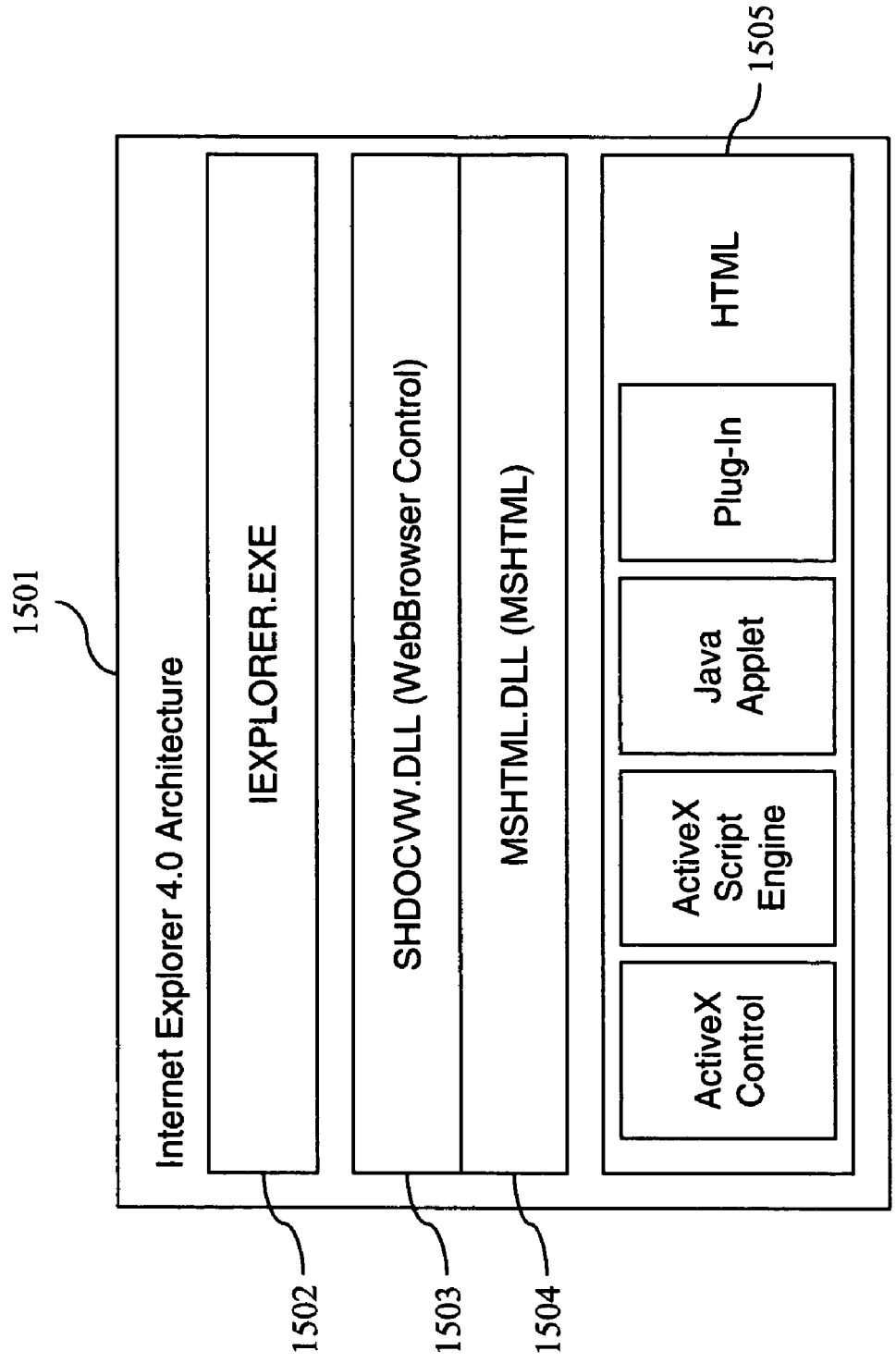
FIG. 15 shows a conventional web browser architecture.

Before introducing the software architecture for 1401, the software architecture for the generic Internet Explorer web browser is presented. Reference will now be made to FIG. 15. 1501 depicts a high-level view of the software architecture for Internet Explorer along with its main software components. IExplore.exe 1502 is at the top level. It is a small application that is instantiated when Internet Explorer is loaded. This executable application uses Internet Explorer components to perform the navigation, history maintenance, favorites maintenance, HTML parsing and rendering, and so on, while it supplies the toolbar and frame for the stand-alone browser. 1502 directly hosts the Shdocvw.dll component 1503, which more frequently referred to as the WebBrowser Control. 1503 in turn hosts the Mshtml.dll component 1504, as well as any other Active Document component (such as a Microsoft Office application) that can be loaded in place in the browser when the user navigates to a specific document type. 1503 supplies the functionality associated with navigation, in-place linking, favorites and history management, and PICS support. (In-place linking refers to the ability to click a link in the HTML of the loaded document and to load a new HTML document in the same instance of 1503.) 1503 is a dynamic-link library (DLL) which exposes interfaces to its host to allow it to be hosted separately as an ActiveX control. Mshtml.dll 1504 is the component that performs the HTML parsing and rendering in Internet Explorer 4.0 and later, and it also exposes the HTML document through the Dynamic HTML Object Model. It is to be noted that if only 1504 is hosted, then a click on a link will result in a new instance of the web-browser. 1504 hosts the scripting engines, Microsoft virtual machine, ActiveX Controls, plug-ins, and other objects that might be referenced in the loaded HTML document. 1504 implements the Active Document server interfaces, which allows it to be hosted using standard Component Object Model (COM) interfaces. 1501 is an OLE-based architecture. The ambient properties that are commonly used by ActiveX Controls can also be applied to the Internet Explorer components. 1503 can set an ambient property that will filter down to all the frames and controls hosted in the loaded document.

Figure 16:
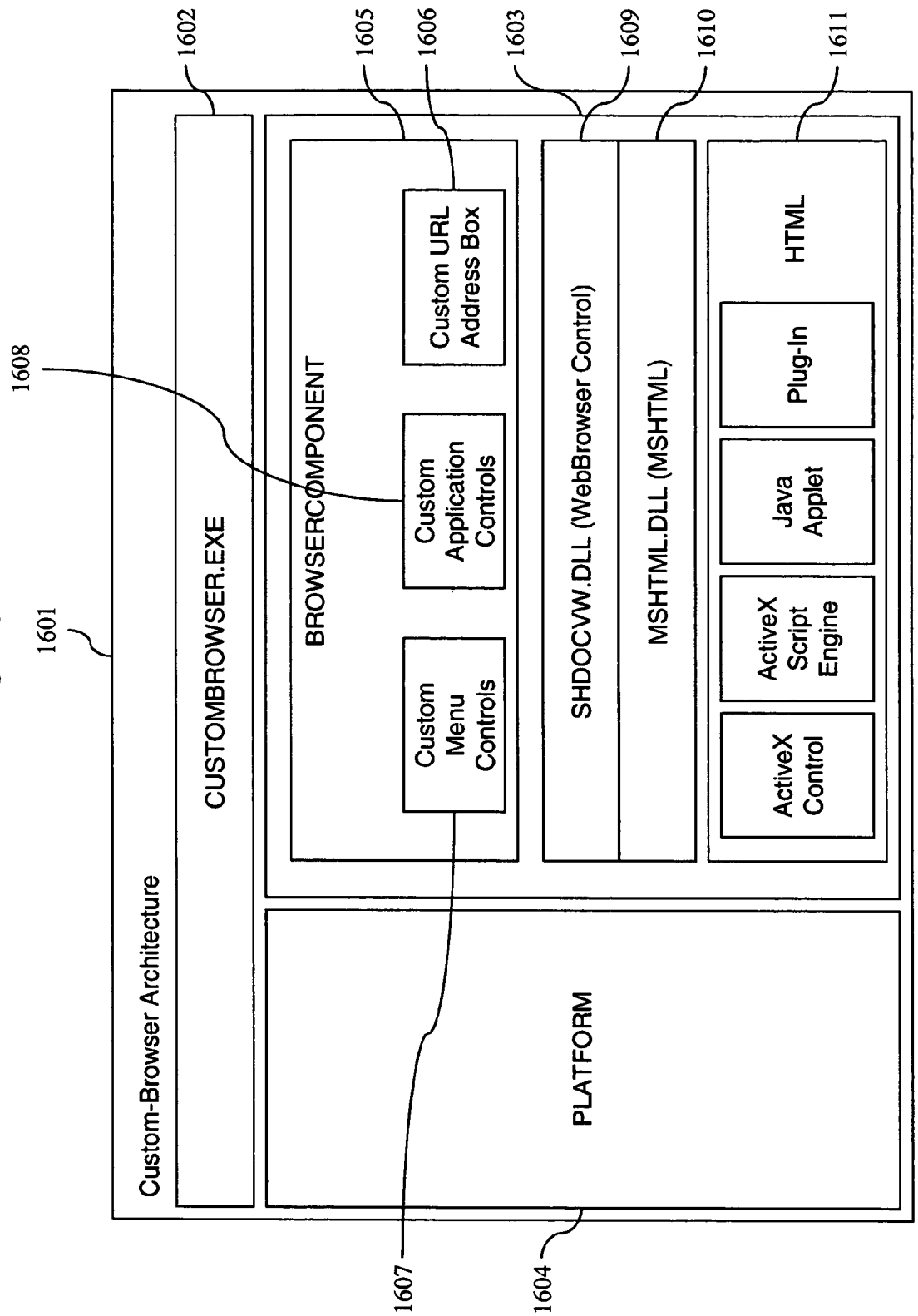
FIG. 16 shows an augmented web browser architecture according to various principles of the invention.

FIG. 16 shows how the architecture in FIG. 15 may be expanded to a new architecture that results in the custom web browser 1401. As mentioned earlier, the custom-built browser may be implemented using the Microsoft .NET Framework. CustomBrowser.exe 1602 is at the top level. It is a small application that is instantiated when custom web browser is loaded. 1602 launches two parallel threads that create two objects. The first object is the PLATFORM object 1604. The second object is the BROWSERCOMPONENT object 1603. The parallelism of the two threads facilitates the independence of the two objects. 1604 is greenfield, and therefore there may be significant flexibility in terms of the (sub) objects contained within 1604. As such 1604 may be capable of implementing a wide range client-server applications, including reusing Internet Explorer components. Object 1603 is of type ApplicationContext, which is a wrapper class. Object 1603 may also have been made of type System.Windows.Forms.Form. The advantage of the ApplicationContext type is that if child web-browsers are spawned from a parent web-browser (e.g., through File->New), then when the parent window is closed, its descendant windows will not be closed along with it. This will not be the case if 1603 is of type System.Windows.Forms.Form. Object 1603 provides the generic web browser functions and features within the custom browser. These functions and features include the rendering of HTML documents, navigation, saving HTML documents, and printing HTML documents. The generic web browser functions and features may be provided using three methods. The first method is reverse-engineering. One example is the menu control "File->New", which may be implemented using the following C# code:

public void Create_New_Form( )

```
public void Create_New_Form( )
{
    CustomBrowser.Form1 form1 = new CustomBrowser.Form1( );
    form1.Closed += new EventHandler(OnFormClosed);
    form1.Closing += new CancelEventHandler(OnFormClosing);
    globalVars.openBrowsers.Insert(globalVars.formCount,form1);
    form1.Show( );
}
```

The reverse engineering method may require the population of files and registry keys for functions such as adding favorites and maintaining list of typed URLs in the URL address box. For example, the following code shows how to access the registry key and read data from it:

```
String sKey = "Software\\Microsoft\\Internet Explorer\\TypedURLs";
RegistryKey kURLs = Registry.CurrentUser.OpenSubKey(sKey);
String sURL;
int nURL = 1;
while(true)
{
    String sValName = "url" + nURL.ToString( );
    sURL = (String)kURLs.GetValue(sValName);
    if((object)sURL == null)
    break;
    // Adding to the ArrayList.
    typedURLs.Add(sURL);
    nURL++;
}
```

A second method for providing web browser functions and features is to take advantage of the fact that Shdocvw.dll 1609 exposes interfaces to its hosts, in order to leverage existing functionality provided by 1609. This method allows for the implementation of menu control functions such as Save, Save As, Page Setup, Print, Print Preview, Properties, Cut, Copy, Paste and Select All; as well as application control functions such as the Back, Forward, Stop, Refresh and Home buttons. For example, the Save As function may be implemented using the following C# code:

```
private void menuFile_SaveAs_Click(object sender,
System.EventArgs e)
{
    Object o = null;
axCustomBrowser2.ExecWB(SHDocVw.OLECMDID.
OLECMDID_SAVEAS,
SHDocVw.OLECMDEXECOPT.OLECMDEXECOPT_DODEFAULT,
        ref o, ref o);
}
The Back button may be implemented using the following C# code:
private    void    toolBarBrowser_ButtonClick(object    sender,
System.Windows.Forms.ToolBarButtonClickEventArgs e)
{
if (e.Button == toolBarButton_Back)
{
  try
  {
    this.axCustomBrowser2.GoBack( );
  }
  catch (Exception ex)
  {
    // Do Nothing
  }
}
else if (e.Button == toolBarButton_Forward)
{
  try
  {
    this.axCustomBrowser2.GoForward( );
  }
  catch (Exception ex)
  {
    //Do Nothing
  }
}
else if (e.Button == toolBarButton_Stop)
  this.axCustomBrowser2.Stop( );
  else if (e.Button == toolBarButton_Refresh)
    this.axCustomBrowser2.Refresh( );
  else if (e.Button == toolBarButton_Home)
    this.axCustomBrowser2.GoHome( );
  ...
}
```

The third method for providing web browser functions and features is a combination of the first two methods, and is used to invoke the Find, View Source, and Options Dialog Boxes for the 1609 from Visual C# .NET. The details of the third method are available on Microsoft's' Help and Support web site.

Generic Internet Explorer uses band objects to enhance the functionality of Search, Favorites, Media and History. For the custom web browser such band objects may be emulated using the following steps: (1) creating an Internet Explorer window that has the size of the vertical bar of the band objects; (2) activating the band object programmatically inside the Internet Explorer window; (3) removing the toolbar and menu bar from the Internet Explorer such that the only item visible in the window is the band object; and (4) positioning the band object to appear on the left side of the browser window. This requires resizing and re-positioning the 1609 window. In order to do this, the properties of Internet Explorer have to be properly set so that they match the height, width and position requirements.

It may be appreciated that Approach 4 for Method B borders on being an approach for Method C.

Client-side installation in general allows for making changes to the Registry (in a Windows Operating System environment), which in turn may facilitate the implementation of the various client-side methods listed above.

Figure 17:
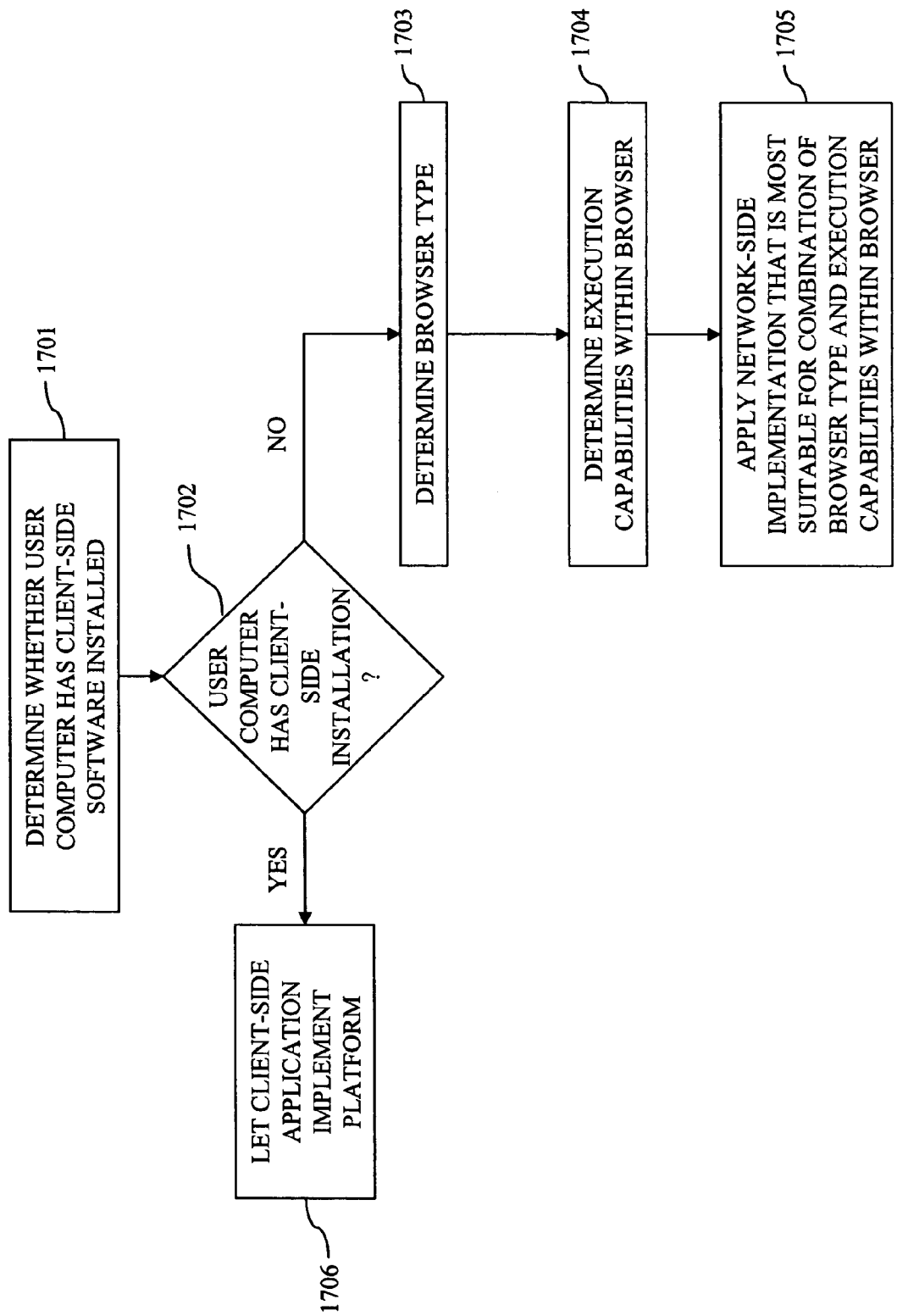
FIG. 17 shows a method of selecting either a client-side or a server-side implementation for creating a platform.

The INE may need to execute an algorithm similar to the one depicted in FIG. 17 to determine whether a server-side implementation (Method A) of the INE platform is needed, or whether Method B or Method C applies. The first step 1701 is to make the determination as to whether any client-side INE platform software exists (either on the computer or within the web browser). This may done using an agreed upon handshaking protocol. When the web browser is initiated, if there is client-side INE platform software, it may issue a "hello" message, with some parameters to describe the nature of the client-side installation, using a standard port. If an HTTP request from a client is preceded by a "hello" message, then the INE may determine that the client has client-side software. If not, then the INE may assume that the client does not have client-side software. Per step 1702 if the client does have client-side software for the INE platform, then the INE will allow the client-side software to establish, manage and maintain the platform. Otherwise, the INE may first make a determination as to what type of web browser the client has. The INE may do so using JavaScript. It is possible that the user may have disabled JavaScript, in which case the INE will not be able to make the determination of the web browser type. In that case, INE may implement Approach 1 of Method A by default. Also, the INE needs to make the determination regarding the execution capabilities of the web browser 1704 (i.e., does the web browser support JavaScript, Java, etc.). Step 1704 within the algorithm may be implemented in the following manner. For detecting JavaScript, an initial version loaded into a new user's web browser may be a non-JavaScript page. Included in this page will be a JavaScript code which redirects the user to a JavaScript version of the page. Thus, if the user's web browser is JavaScript-enabled, then it automatically uses this JavaScript version. In terms of detecting plug-ins in general, the most reliable method of detecting the presence and status of plug-ins (such as Java, Flash, Active-X) is to create small applications for each plug-in, where each application re-directs the user's browser to a plug-in-enabled version of the initial page. This is a common methodology used in the web-development community for detecting plug-in capabilities in web browsers. For example, to detect whether Java is enabled, there is a small Java applet which redirects the web browser to a Java-enabled version of the page, at which point the web browser is able to subsequently use the full functionality of Java. If Java is not enabled, then this redirection will not happen and the web browser will remain on the initial non-Java page. A similar method can be used for Flash, where a small Flash movie redirects the web browser to a Flash-enabled version of the page, and otherwise the web browser remains on the basic Flash-disabled version of the page. It is to be noted that this redirection only happens once, when the end-user first enters the network. Another option to detect plug-ins is to use the JavaScript function 'enabledPlugin', but this requires the presence of JavaScript to begin with, and more importantly, is not supported by older versions of many web browsers. It is also to be noted that even if a plug-in is present, it may or may not be enabled. Therefore, it is not sufficient to use techniques (such as JavaScript functions) which simply test for the presence of plug-ins. Based on the information obtained by the INE regarding the web browser type and its execution capabilities, the INE may implement an algorithm to determine the best approach to use, among the possible approaches for Method A.

It will be appreciated that one of the benefits of the INE platform is that it allows the user to have a shortcut and/or one-click access to content and/or applications and/or services provided by the INE, including but not limited to:

1—General Information.
2—Links to general information—upon clicking on the link, the detailed information may
   a. Appear in a subset of the INE platform.
   b. Occupy the entire platform.
   c. Appear in a new instance of the web-application window.
   d. Replace Content from the origin server.
3—Links to businesses.
4—Remote ordering applications.
5—Auction service with other users.
6—Auction services with businesses.
7—Links to download new applications.
8—Gaming/links to games.

The above will henceforth be referred to as Portal Services.

It will be appreciated that the INE may leverage any information it possesses about the user to provide personalized Portal Services and experience to that user. In particular, one piece of information that an ISP may possess about the user is the location of the user and/or the user's premises, to varying degrees of accuracy.

Methods for determining the location of the user and/or user's premises include but are not limited to:

1—User explicitly specifying the user's location (completely or partially e.g., zip code) through voice communication and/or electronic communication.
   2—In the case of point-to-point (wired or wireless) connection between the INE and the user's premises and/or computer, then knowledge of where the other end-point terminates can be used to discern the location of the user and/or user's premises.
   3—In the case of non-point-to-point wireless connection between the INE and the user's premises/computer, then the radius and footprint of wireless coverage can be used to estimate the location of the user and/or user's premises.
   4—In the case of non-point-to-point wired/wireline connection between the INE (e.g., shared channel such as Cable Modem), the location of the user and/or user's premises can be determined or estimated based on the physical location of the shared medium (e.g., Network ring) through which the user is connected to the ISP/PSO.
   5—The user's billing address.
   6—The MAC ID or any unique identifier of Customer Premises Equipment, such as a Cable modem or a DSL modem.
   7—GPS technology embedded in Customer Premises Equipment.

An INE in general and an ISP in particular may determine the location, to varying degrees of accuracy, using algorithms that use one item of the above or a combination of items.

Figure 18:
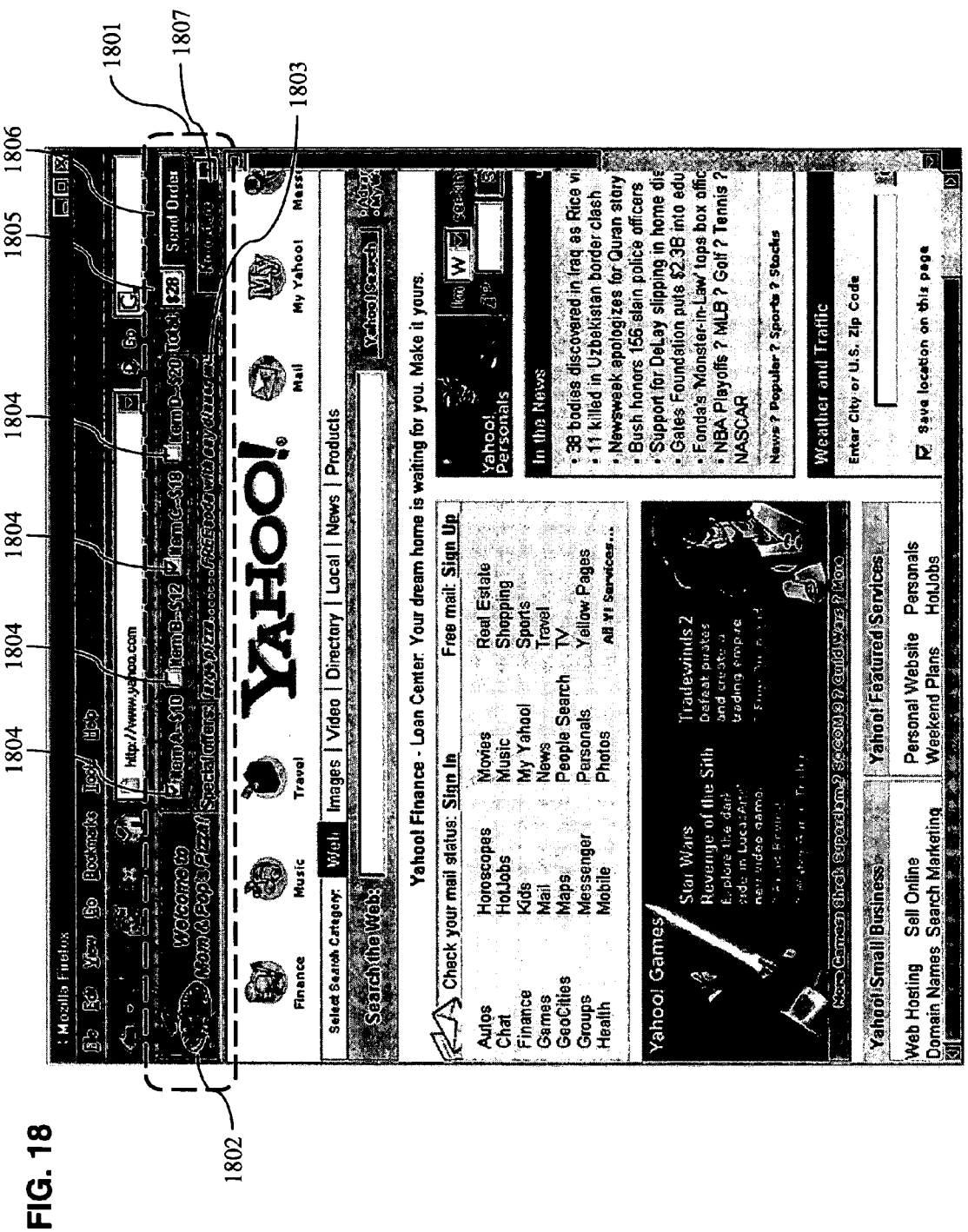
FIG. 18 depicts the use of the INE platform for a remote ordering system.

FIG. 18 depicts the use of the INE platform for a remote ordering system. FIG. 18 envisions that the ISP is a Pizzeria providing wireless local area network access to the Internet. The NE platform 1801 is web browser platform. It will be appreciated that the background color of 1801 matches the "skin" color of the web browser, making the INE platform less intrusive to the user. 1802 is a subsection of the INE platform, and is used to display the logo of the Pizzeria. 1803 is an area within the INE platform with crawling text announcing special deals at the pizzeria. It will be appreciated that the INE platform may support dynamic content, allowing for the use of animation and crawling text to compensate for the potentially small size of the INE platform. The user can select items to order by checking the box 1804. The total of the order is displayed in 1805. Upon completing the selection, the user can click 1806. 1807 displays the status of the order. Prior to submitting an order, 1807 may display "No Order". While the order is being fulfilled, 1807 may display "Order Pending". Upon completion of the fulfillment of the order, 1807 may display "Order Complete", at which point the order may be delivered to the user or the user may go pick up the order.

Figure 19:
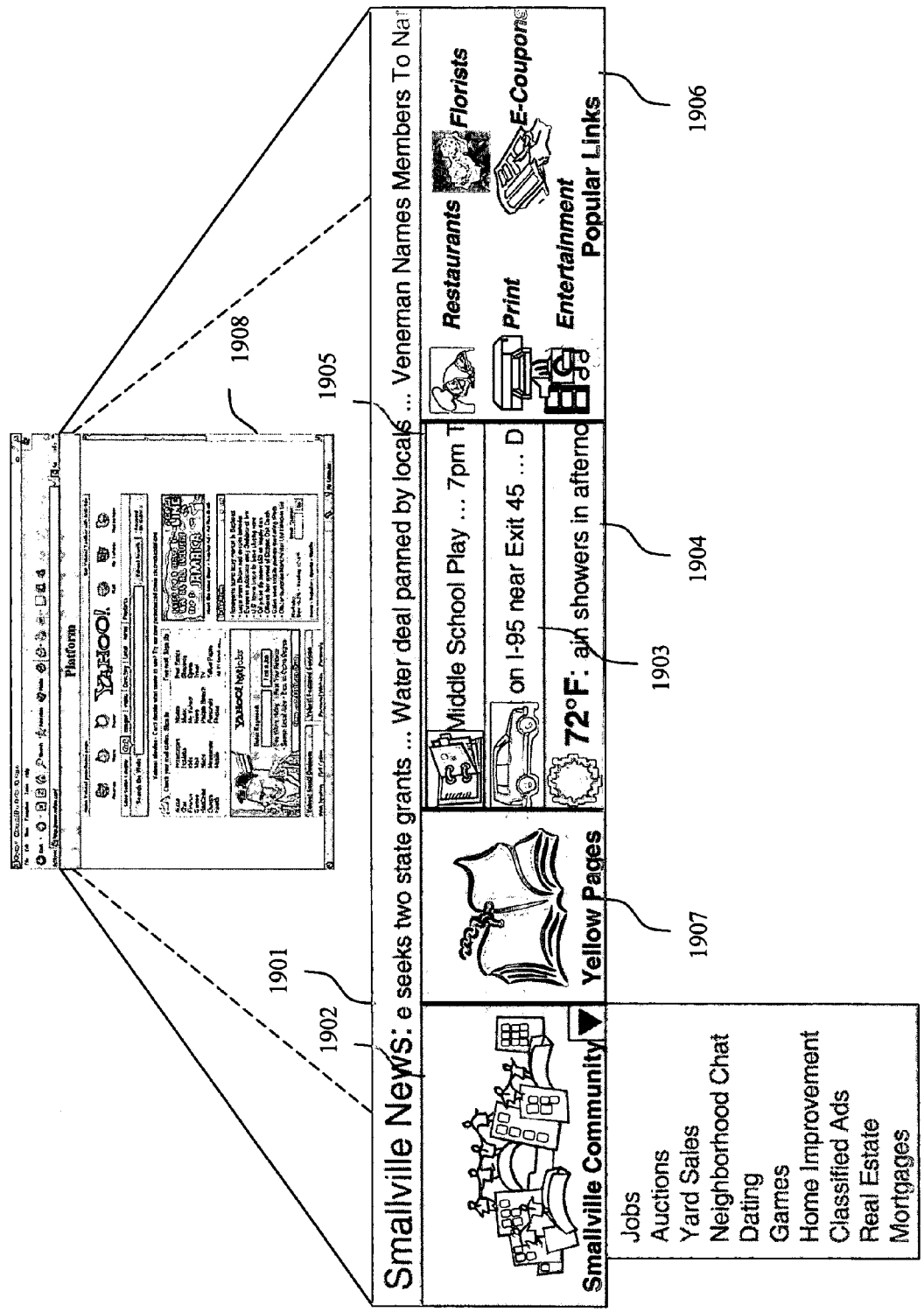
FIG. 19 depicts another example for the INE to utilize the INE platform, such as to provide a community and local commerce portal.

FIG. 19 depicts another example for the INE to utilize the INE platform. In FIG. 19, the INE is utilizing the INE platform to provide a community and local commerce portal. As a community portal, the INE leverages Internet technology to strengthen the community's relations, by facilitating and increasing interactions and person-to-person commerce among members of the community. The INE can facilitate and increase commerce between members of the community and local businesses, by providing capabilities such as yellow-pages services, remote ordering capability, interactive advertising, and printing services.

The INE platform in FIG. 19 is divided into several sections. 1901 displays news headlines to the user as crawling text. The headlines are local headlines, based on the location of the user. The user may click "Smallville News" to be presented with all the headlines in several formats including but not limited to (1) in the INE platform itself; (2) in the web browser's main window 1908; and (3) in a new instance of the web browser.

The user may alternatively click on one of the headlines or can click a particular crawling headline to go directly to the body of that particular headline. 1902 provides access to community services such as job listings, local Auctions, chatting with others in the community, and dating. The user can either click on the image to go to a full front page of community services or can select a particular service from a drop-down menu.

Section 1903 contains information about the local traffic. Section 1904 contains information about the local weather. Clicking on it will provide additional information about the weather including the forecast for the week. Section 1905 provides information about events in the community. Clicking on will provide more detailed information. Section 1906 provides one-click access to popular services in the community. For example clicking on "Entertainment" can provide information about what movies are playing in local movie theatres, or what it playing on TV. Clicking on E-Coupons will lead to a page containing discount coupons for local businesses. This can be a substitute for mail coupons. The electronic coupons may have expiration times on them e.g., the user must click on a coupon in the next minute or it expires. Upon clicking on a particular coupon the user is connected to the corresponding business sponsoring the coupon. Section 1907 provides a link to "Yellow Pages Directory Services" personalized for the user's community and potentially for the user's profile and preferences.

The geography-specific nature of the INE Portal depicted in FIG. 19 can be a source of differentiation from established portals such as Yahoo, Ebay, and Amazon, and offer customized value-added services to the user. The ISP/PSO will provide e-society and e-commerce services that are specific to the neighborhood/community/region of the user.

There are several ways in which an INE can present a business to a user via the INE platform including but not limited to: (1) links to the business web page(s); (2) business logos; (3) news about the business; (4) description of the services and offerings of the business; and (5) facilitating commerce between the user and the business, including allowing user to order online from the business or simply connecting the user with the business.

To illustrate how the INE platform may be leveraged to facilitate and accelerate commerce, reference is again made to FIG. 19. Building on the example in FIG. 19, suppose the user clicks on "Restaurants" in 1906. Upon clicking on that link, the user is redirected to the view 2001 depicted in FIG. 20. 2001 is displayed within the INE platform, but may have also been contained in other formats including but not limited to: (1) In the web browser's main window 2008; (2) In a new instance of the web browser.

Figure 20:
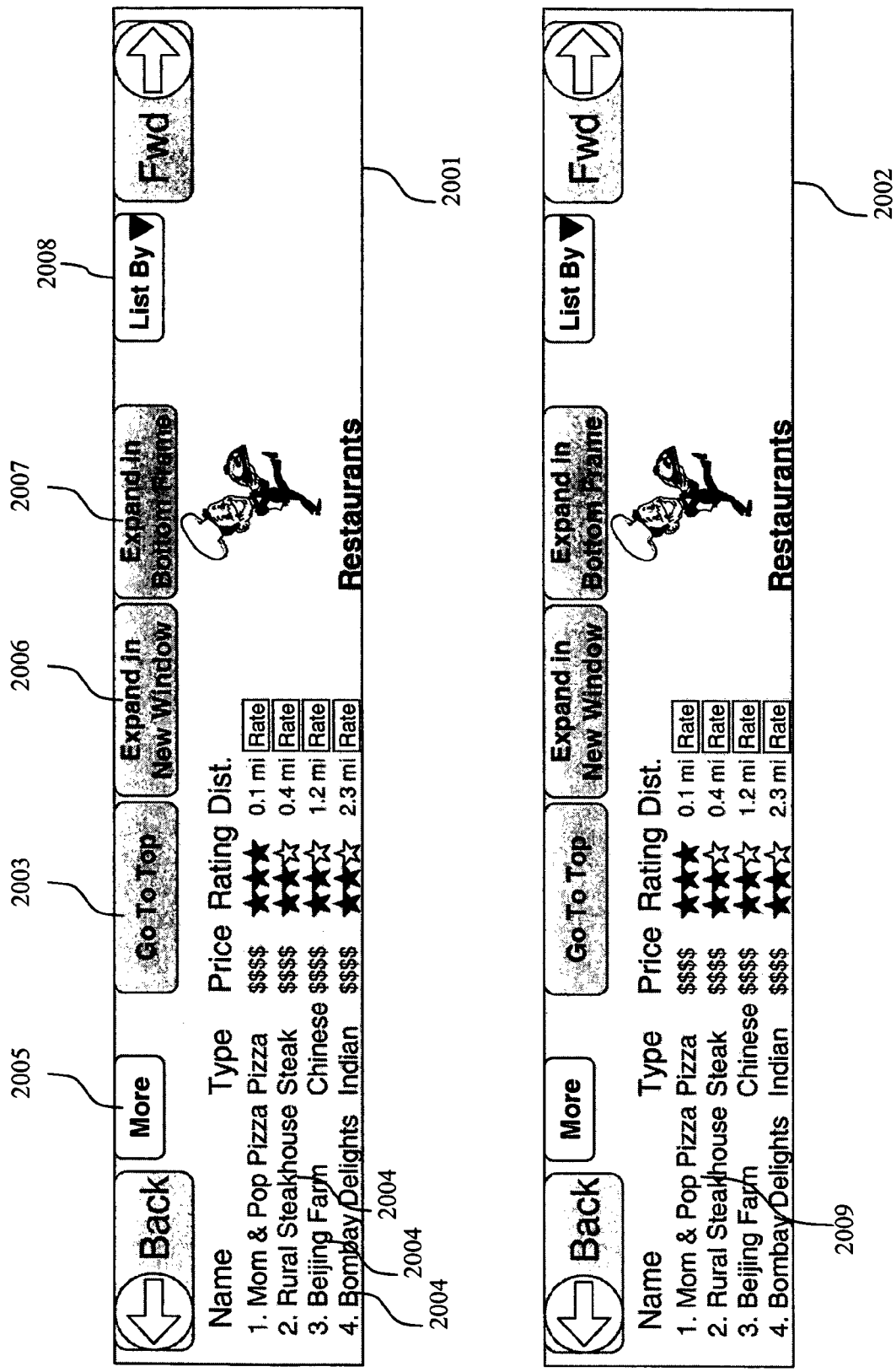
FIG. 20 shows another example for the INE to utilize the NE platform.
Figure 21:
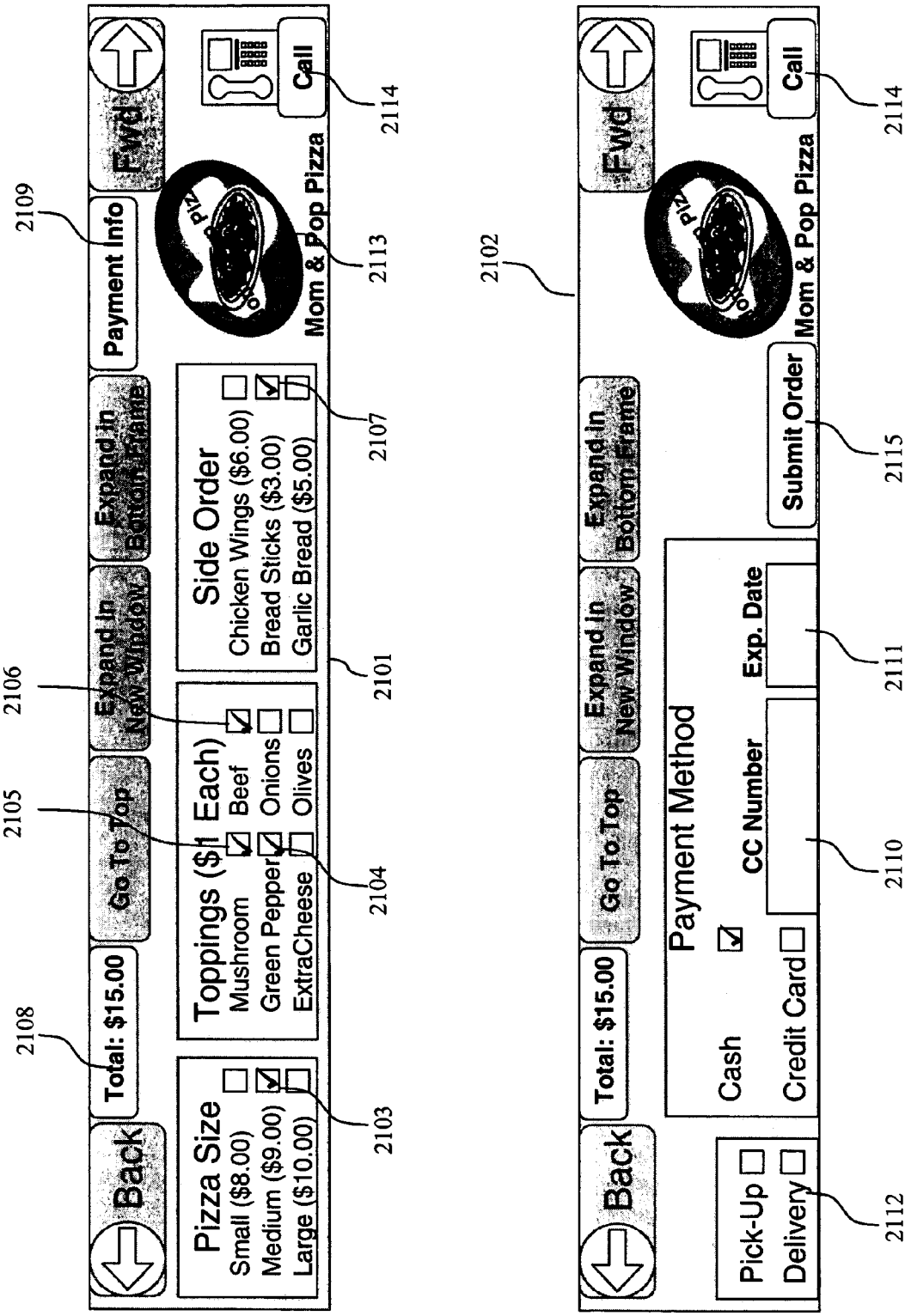
FIG. 21 shows another example for the INE to utilize the INE platform.

Jumping ahead, 2101 and 2102 in FIG. 21 also have the same alternatives vis-à-vis the format in which they are displayed. Returning to 2001, there are several things to point out. First, the user can return to the top-level view of the Portal by clicking on the "Go To Top" button 2003. Second, the restaurants 2004 seemingly are listed in a random order. However, it is assumed that restaurants will be able to bid for higher positions on the list that is initially presented to the user. This is a form of advertising that today is successfully employed by search engines such as Google. In FIG. 20, the order may be based on a formula that incorporates the restaurant's bid amount as well as its distance from the location of the user—a restaurant that is one-hundred miles away should not be listed first even if it pays one-hundred times the amount paid by a restaurant that is only one mile away. Third, the user will be able to view additional restaurants by clicking on the "More" button 2005. Fourth, the user can display the information in a bigger space, by either clicking on the "Expand in New Window" button 2006, which will open up a new web browser window, or by clicking on the "Expand in Bottom Frame" button 2007 which replace whatever content is in the main window of the current web browser. Fifth, the user may override the current order in the list through the dropdown "List By" menu 2008.

Assuming the user re-lists the restaurants by distance, the result is shown in 2002. The user may then click on "Mom & Pop Pizza" 2009, which will take him/her to the view 2001 shown in FIG. 21. 2101 shows a remote electronic ordering system. The remote ordering system may contain a logo for the pizzeria 2113. The user can specify his/her order by checking the appropriate boxes in 2101, such as 2103, 2104, 2105, 2106, and 2107. A calculator 2108 updates the total of the order. Upon clicking on the "Payment Info" button 2109, the user is taken to the view in 2102, where the user is asked to enter the payment information 2110 and 2111 and specify whether the order is for pick-up or delivery 2112.

The views in 2101 and 2102 contain a "Call" button 2114. At any time the user may click on 2114 to establish a voice connection with Mom & Pop Pizza. Establishing the voice connection will be handled and managed by the INE. There are several ways for establishing the voice connection, including but not limited to:

1—The voice connection from the user to the Portal will be a Voice-over-Internet-Protocol connection, and that from INE to Mom & Pop Pizza will be either a traditional telephone connection, or a VOIP connection. The two connections will be patched together by the INE. The capability to patch voice connections can be used to establish VOIP connections between users in chat rooms etc. is prior art. One advantage for this service is that it can allow two people to have a voice conversation without necessarily giving out their telephone numbers.

2—Assuming the INE has knowledge of the user's telephone number, the INE can make to separate traditional telephone calls, one to the user and one to the business, and subsequently patch the two connections.

The ability to establish voice connections using a traditional telephone connection will be greatly enhanced if the INE is an ISP which is also a Local Exchange Carrier (LEC), who for instance might also be a DSL provider.

The example in FIG. 20 and FIG. 21 show how the INE can facilitate commerce between the user and a local business. Not only will the user be able to quickly access the remote ordering systems for local businesses, but he/she will also be able to directly talk to them, without even having to look up their telephone numbers.

Business presented or presented prominently to the user may be selected based on several criteria including but not limited to the geographic relation between the business and the user. Furthermore, the manner in which a business is presented to the user may vary depending on the personal preferences of and/or the profile of and/or the service level for the user.

Similarly, the INE can facilitate web-based interactions between the user and local government, including any type of information or services provided by the local government.

It will be appreciated that establishing voice connections can be applied to any group of users of the INE services. This includes but is not limited to establishing a voice connection among users in a chat room. Furthermore, it will be appreciated that voice is not the only mode of communications that can be established. Other modes of communication include but are not limited to (1) video communications; (2) online chatting; (3) email; (4) connection to a web page, which may have its own remote ordering system; and (5) SMS.

From the perspective of a local businesses however, it is not always the case that the business has an electronic system to receive the order from the user (when the user uses the remote ordering system, as illustrated in FIG. 21). The INE should be capable of conveying the order to the local business in a way that is compatible with the local business's technological capabilities. It is envisioned that there will be at least two possibilities for doing so. First, the INE may translate the order into an email and send the email to the business. Second, the INE may translate the order into voice, call the business and deliver the order as a voice message.

Moreover, the INE may provide an easy method for a local business to specify its service parameters, including but not limited to: (1) Listing its services and prices e.g., those for Mom & Pop Pizza in 2101; and (2) specifying its geographic area of service and/or delivery. This specification may make a distinction between which households they want to be presented to and which households they are able to deliver to.

Figure 22:
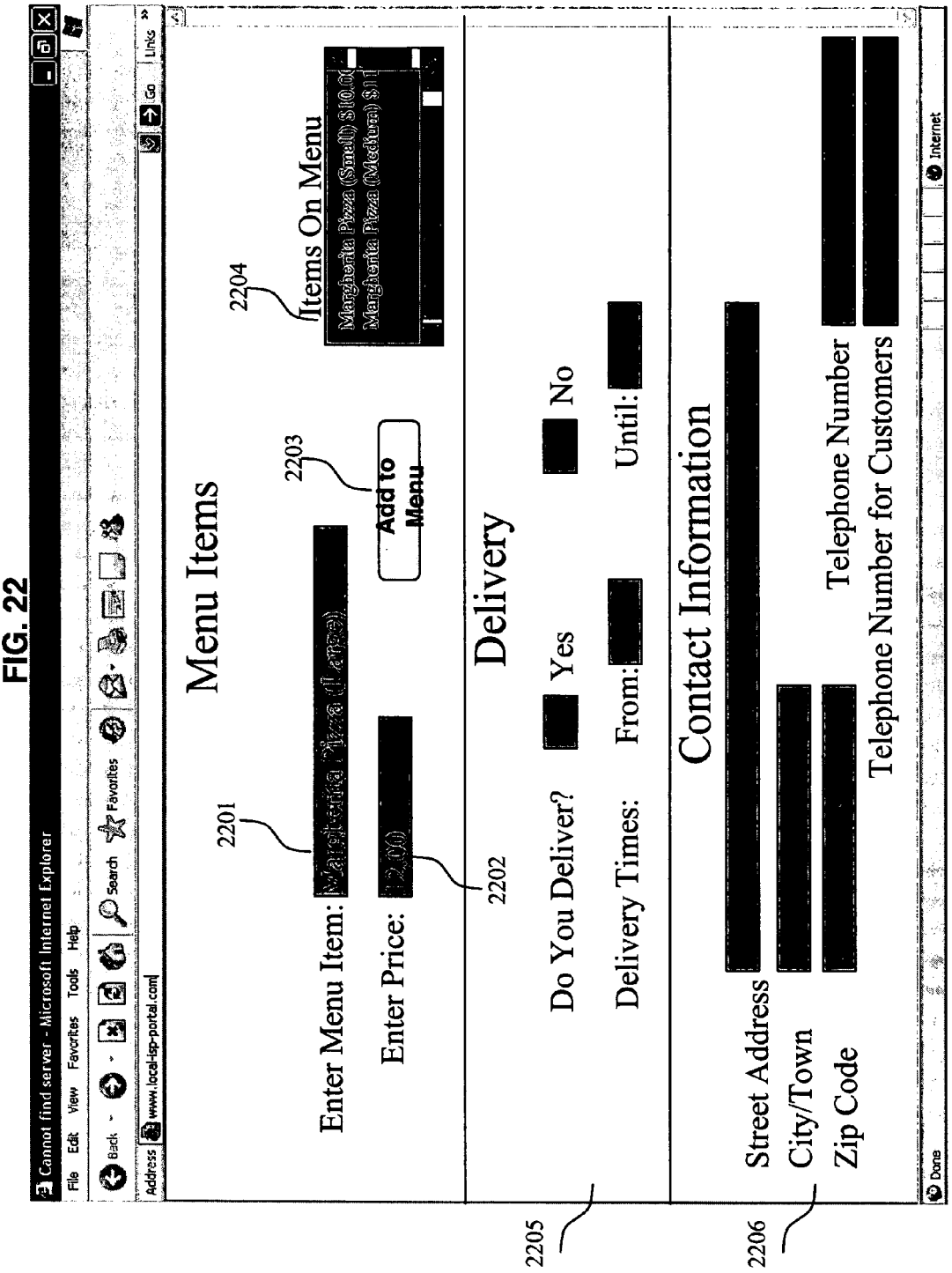
FIG. 22 shows another example for the INE to utilize the INE platform.

FIG. 22 depicts an example of how a pizza restaurant may enter its menu into the INE's database. In a very simple fashion, Mom & Pop Pizza can enter the name of a menu item in 2201, specify its price in 2202, and then click on 2203 for the item to appear in the "Items On Menu" window, 2204. 2204 can be scrolled horizontally and vertically. Similarly, the business can specify whether it delivers or not in 2205, as well as its contact information in 2206. The telephone number in particular will be useful for establishing a voice connection between the user and the business.

Figure 23:
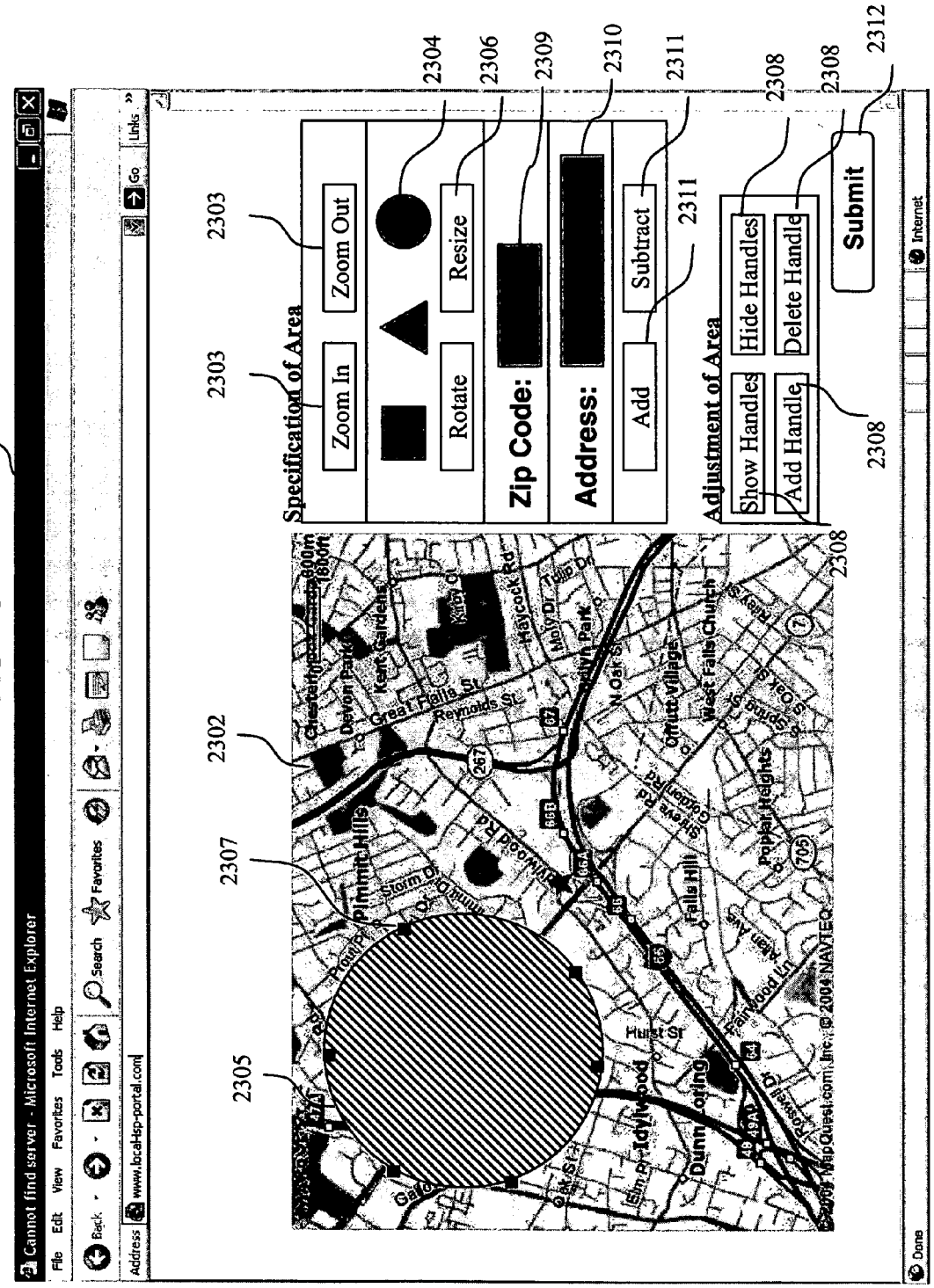
FIG. 23 shows another example for the INE to utilize the INE platform.

There will be different templates for different types of businesses, but the common theme will be that local businesses will not have to do more than simple data entry in order to specify their service parameters. The one soft exception is the method by which local businesses specify their service/delivery areas. FIG. 23 illustrates an example of how a business can specify its area of delivery, using a generic web browser, 2301. The business can specify locations on the map for separate purposes including but not limited to (1) defining geographical areas of users to which it wants to be presented to via the INE's service; and (2) defining geographical areas where the business agrees to deliver.

The business may specify locations using several methods including but not limited to (1) graphically overlaying shapes on the map; (2) entering a zip code or zip codes; and (3) entering a specific address or specific addresses.

For the sake of simplicity, locations specified for any reason will henceforth be referred to as service area.

Using the application depicted in FIG. 23, based on the address of the business (or any other address explicitly specified by the business), a map 2302 of the surrounding area of the specified address appears. The business can zoom into and out of the displayed map by clicking on the appropriate button 2303 (i.e., "Zoom In" or "Zoom Out"). The business can also overlay standard shapes on the map (including on the map by clicking on the appropriate shape 2304. The standard shapes include but are not limited to a square, a circle, and a triangle. The business subsequently can rotate and resize the overlay by clicking on the appropriate control button 2305. Furthermore, the business can modify the shape via handles 2307. The business can display, hide, add, or delete the handles 2307 by clicking on the appropriate control button 2308. Once the handles are displayed, the business can use a computer mouse to drag them in any direction. As the handles are moved around, the overlay is reshaped to remain consistent with the location of the handle. Alternatively, the business may specify a specific zip code 2309 or a specific address 2310, and a corresponding overlay will appear in 2302. If the business wants to add to overlay to the list of specified then may specify whether the overlay is to be added to or excluded from the Service Area by clicking on the appropriate button 2311. Finally, the business can submit the specification of the Service Area by clicking on 2312. Subsequently, the business may use a query tool, to check whether an individual address is included in the Service Area or not.

Other means for defining a Service Area include but are not limited to (1) filling out a form; (2) calling into a call center; and (3) using a standalone GIS application.

Figure 24:
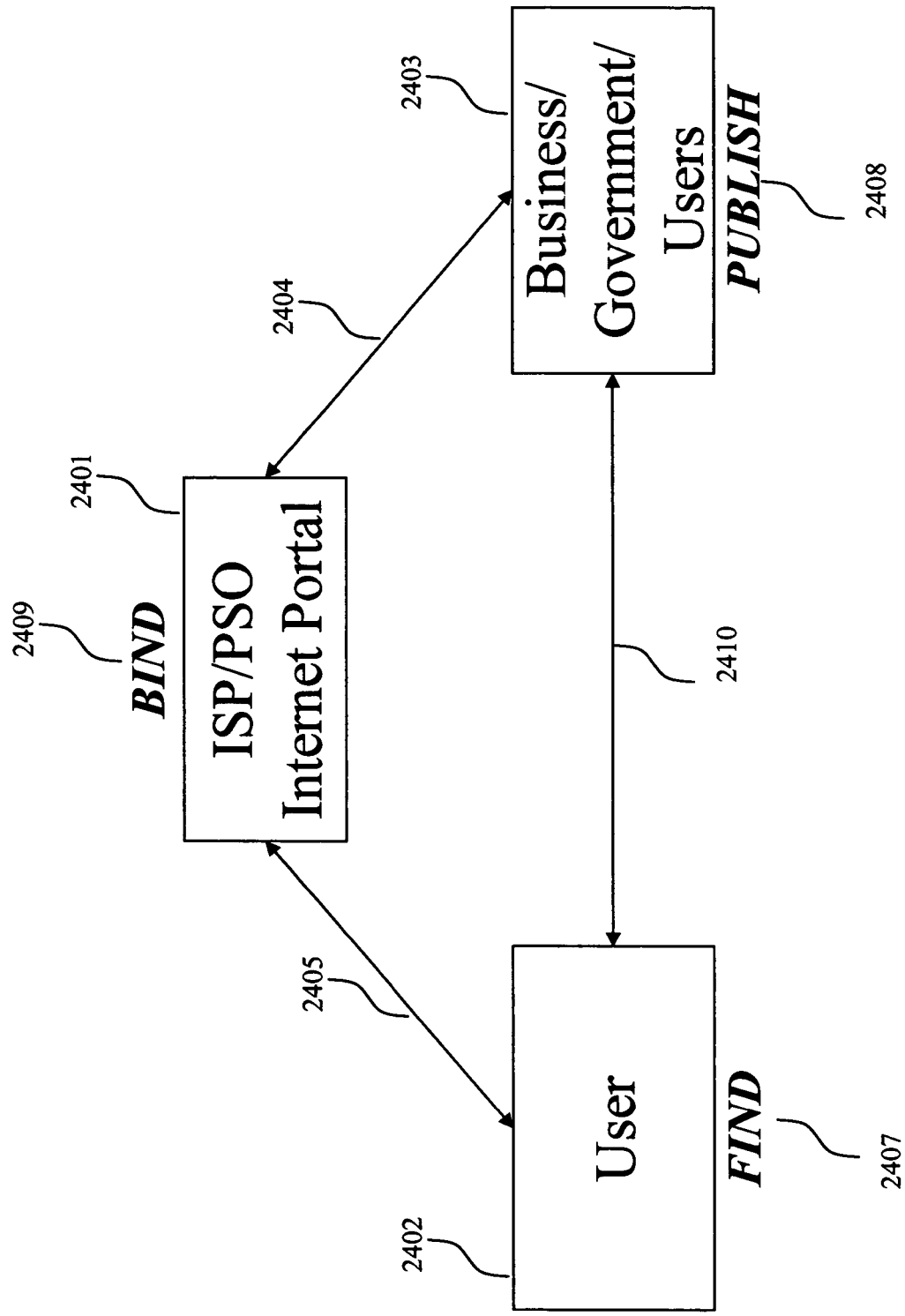
FIG. 24 shows a system environment in which various aspects of the invention can be carried out.

In general, the prominence of platform to the user, the ability of an INE to determine the location of the user to various degrees of accuracy, and the simple manner in which a provider of a service may define its service will enhance the appeal of an Internet Portal service provided by an INE such as the one depicted for an ISP or a PSO in FIG. 24. 2403 provides information, offerings and services to a user 2402. 2403 publish 2404 their profiles and data to the INE Portal 2401. A user 2402 seeks 2405 the information/offerings/services of 2403. 2401 binds 2409 the two, matching "supply and demand", while allowing 2402 and 2403 to communicate (using various methods) either via 2401 or directly 2410. The management of acquiring data from 2402 and 2403 as well as maintaining, storing and updating that data may be performed by the INE or through a third-party aggregator.

Any of the steps or modules described above may be provided in software and stored as computer-executable instructions on one or more computer-readable media. Numerals used in the appended claims are provided for clarity only and should not be interpreted to limit the order of any steps or elements recited in the claims.

What is claimed is:

1. A method for rendering web content, comprising the steps of:
   receiving, at a processing at agent, the web content, located at a specified web address, from a web server corresponding to the specified web address;
   generating or causing to generate, at a frameset server, a web page, wherein the web page comprises the web content and an Intermediate Network Entity (INE) platform having additional content independent from the web content;
   maintaining state information for the INE platform in an INE server; and
   providing, by a web page redirection agent, the web page in response to a first request to a web browser, wherein the web page comprises a first frame having the INE platform including a dedicated area in which the additional content independent from the web content is displayed and a second frame comprising the web content from the web server, and the first frame and second frame are both displayed within a web browser window;
   receiving one or more subsequent requests from the web browser for another web content;
   detecting whether the one or more subsequent requests is generated from a Universal Resource Locator (URL) embedded in the web page,
   if the one or more subsequent requests is generated from the embedded URL, inhibiting generation of a new first frame having the INE platform by causing the another web content to be displayed in the second frame without modifying the additional content of the first frame,
   if the one or more subsequent requests is not generated from the embedded URL, generating a new web page including a new first frame having the INE platform and a new second frame for displaying the another web content.

2. The method of claim 1, wherein prior to said receiving web content step, the following steps are taken:
   receiving, at a web page redirection agent, the h the web content located at the specified web address;
   intercepting, at a proxy server, the first request and redirecting the first request to a processing agent;
   generating from the processing agent a modified request to fetch the web content from the web server corresponding to the specified web address.

3. The method of claim 2, further comprising the step of:
   in the processing agent, detecting embedded Uniform Resource Locators (URLs) in the web page received from the web server and replacing them with modified URLs.

4. The method of claim 2, wherein the processing agent flags embedded URLs by modifying them in a manner that indicates whether a URL was modified and allows for retrieval of original URL from the modified URL.

5. The method of claim 2, further comprising the step of changing the platform content after said providing step without changing the web content from the web page.

6. The method of claim 2, wherein steps of said intercepting, said generating the modified request, said receiving, said generating the web page, and said providing web page are performed on a server located separately from a computer on which the web browser is located.

7. The method of claim 2, wherein steps of said intercepting, said generating the modified request, said receiving, said generating the web page, and said providing the web page are performed on the same computer on which the web browser is located.

8. The method of claim 2, wherein steps of said intercepting, said generating the modified request, said receiving, said generating the web page, and said providing the web page are performed in the web browser.

9. The method of claim 2, further comprising the step of detecting whether the first request was flagged and, if so, inhibiting the generation of the first frame.

10. The method of claim 2, further comprising the step of generating the additional content for the INE platform that is dependent upon a determined location of a user of the web browser.

11. The method of claim 2, wherein steps of said receiving, said intercepting, said generating the modified request, said receiving the web content, said generating the web page, and said providing the web page are performed by an Internet Service Provider (ISP).

12. The method of claim 1, wherein the web content comprises an e-mail message body; and the page web comprises a new e-mail message body comprising the e-mail message body and the INE platform in which the additional content independent from the e-mail message body is placed.

13. The method of claim 1, wherein the web page comprises a cascading style sheet (CSS) element comprising the dedicated area in which the additional content independent from the web page is placed.

14. The method of claim 1, wherein the web page comprises a Java applet comprising the dedicated area in which the additional content independent from the web page is placed.

15. The method of claim 1, wherein the web page comprises an ActiveX control comprising the dedicated area in which the additional content independent from the web page is placed.

16. The method of claim 1, wherein the web page comprises a third-party web browser plug-in object comprising the dedicated are in which the additional content independent from the web page is placed.

17. The method of claim 1, wherein the second frame is scrollable independently of the first frame in the browser window.

18. The method of claim 1, wherein said generating the web page step comprises the step of generating the first frame in a non-overlapping position with the second frame, such that both the first and second frames are fully visible in the web browser window.

19. The method of claim 1, wherein step of said generating the web page comprises the step of flagging one or more embedded URLs in the web page, by modifying them in a manner that indicates whether a URL was modified and allows for retrieving original URL from the modified URL, wherein the flagging serves to inhibit further generation of the first frame upon activation of the one or more embedded tags.

20. The method of claim 1, wherein said generating the web page comprises the step of generating JavaScript code that creates a frameset including the first frame comprising the INE platform including the dedicated area in which the additional content independent from the web content is displayed and a second frame comprising the web content.

21. The method of claim 20, wherein: the JavaScript code checks the presence of a frameset and, if no frameset exists, creates a frameset including a first frame comprising an INE platform including a dedicated area in which content independent from the web page is displayed and a second frame comprising the web content.

22. A module embedded in a computer readable storage medium, when executed by one or more processors, for inserting additional content into a web page, the module comprising:
a proxy server configured to generate modified requests for web content and another web content, and receive the web content and the another web content from a web server;
a web page redirection agent configured to intercept a first request for the web content and to redirect the first request to the proxy server;
a response modification agent configured to flag Universal Resource Locators (URLs) contained in the web content received by the proxy server, and generate or cause to generate by a frameset server the web page comprising a first frame having an Intermediate Network Entity (INE) platform including a dedicated area for displaying the additional content independent from the web content and a second frame for displaying the web content, wherein the first and second frames are displayed in a web browser window;
an INE content server for maintaining state information for the INE platform; and
a request modification agent configured to:
receive the first request for the web content and one or more subsequent requests for another web content from the proxy server, and
determine whether the one or more subsequent requests was previously flagged,
if the one or more subsequent requests was not previously flagged, generate a new web page including a new first frame having the INE platform and a new second frame for displaying the another web content, and
if the one or more subsequent requests was previously flagged, inhibit generation of the new first frame by causing the another web content to be displayed in the second frame without modifying the additional content of the first frame; and
wherein the web page redirection agent returns to a web browser the first frame and a second frame comprising the additional content and the web content.

23. A module embedded in a computer readable storage medium, when executed by one or more processors, for inserting additional content into a web page, the module comprising:
means for generating modified requests for web content and another web content, and receive the web content and another web content from a web server;
means for intercepting a first request for the web content and to redirect the first request to the proxy server;
means for flagging Universal Resource Locators (URLs) contained in the web content received by the proxy server, and generating or causing to generate by a frameset server the web page comprising a first frame having an Intermediate Network Entity (INE) platform including a dedicated area for displaying the additional content independent from the web content and a second frame for displaying the web content, wherein the first and second frames are displayed in a web browser window;
means for maintaining state information for the INE platform; and
means for:
receiving the first request for the web content and one or more subsequent requests for the another web content from the proxy server,
determining whether the one or more subsequent requests was previously flagged,
if the one or more subsequent request was not previously flagged, generating a new web page including a new first frame having the INE platform and a new second frame for displaying the another web content, and
if the one or more subsequent requests was previously flagged, inhibiting generation of the new first frame by causing the another content to be displayed in the second frame without modifying the additional content of the first frame; and
means for returning to a web browser the first frame and a second frame comprising the additional content and the web content.

24. The of claim 23, wherein the means for generating further comprises means for detecting embedded Uniform Resource Locators (URLs) in the web page received from the server and, in response thereto, replacing them with modified URLs.

25. The module of claim 23, wherein the means for generating the new web page generates the first frame and the second frame in a non-overlapping positions.

* * * * *

UNITED STATES PATENT AND TRADEMARK OFFICE
CERTIFICATE OF CORRECTION

PATENT NO. : 7,533,144 B2  
APPLICATION NO. : 11/129476  
DATED : May 12, 2009  
INVENTOR(S) : Hisham Kassab It is certified that error appears in the above-identified patent and that said Letters Patent is hereby corrected as shown below:

Column 6; Line 7:
Current: (NE). By virtue of being physically in the path between the
Should Be: (INE). By virtue of being physically in the path between the Column 21; Line 44
Current: method are available on Microsoft's' Help and Support web
Should Be: method are available on Microsoft's Help and Support web Column 28; Line 28 to Line 29:
Current: receiving, at a web page redirection agent, the h the web content located at a specified web address;
Should Be: receiving, at a web page redirection agent, a first request to fetch web content located at a specified web address;

Column 29; Line 7:
Current: prises an e-mail message body; and the page web comprises
Should Be: prises an e-mail message body; and the web page comprises Column 30; Line 17:
Current: ously flagged, generate a new web page including a
Should Be: ously flagged, generate or cause to generate a new web page including a Signed and Sealed this
Twenty-third Day of August, 2011

David J. Kappos
*Director of the United States Patent and Trademark Office*